(12) United States Patent
Oishi et al.

(10) Patent No.: US 8,132,550 B2
(45) Date of Patent: Mar. 13, 2012

(54) ROLLER BEARING, CAMSHAFT SUPPORT STRUCTURE, AND INTERNAL COMBUSTION ENGINE

(75) Inventors: Shinji Oishi, Iwata (JP); Akihiko Katayama, Kikugawa (JP); Yugo Yoshimura, Iwata (JP); Katsufumi Abe, Iwata (JP); Hiroki Tsuchiyama, Utsunomiya (JP); Noriaki Fujii, Wako (JP); Tomoya Fujimoto, Wako (JP); Keiko Yoshida, Wako (JP); Kiminori Komura, Wako (JP); Kazuto Abe, Wako (JP)

(73) Assignees: NTN Corporation, Osaka (JP); Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 12/310,676

(22) PCT Filed: Aug. 30, 2007

(86) PCT No.: PCT/JP2007/066942
§ 371 (c)(1),
(2), (4) Date: Mar. 4, 2009

(87) PCT Pub. No.: WO2008/029714
PCT Pub. Date: Mar. 13, 2008

(65) Prior Publication Data
US 2009/0235887 A1 Sep. 24, 2009

(30) Foreign Application Priority Data

| Sep. 4, 2006 | (JP) | 2006-238426 |
| Sep. 4, 2006 | (JP) | 2006-238427 |
| Sep. 4, 2006 | (JP) | 2006-238429 |
| Sep. 4, 2006 | (JP) | 2006-238432 |
| Sep. 4, 2006 | (JP) | 2006-238433 |

(51) Int. Cl.
F01M 1/06 (2006.01)
(52) U.S. Cl. ............ 123/90.33; 123/90.34; 384/419; 384/428
(58) Field of Classification Search ............ 123/90.6, 123/90.1, 90.33, 90.34; 384/419, 428
See application file for complete search history.

(56) References Cited

U.S. PATENT DOCUMENTS

| 3,306,682 A | 2/1967 | Cowles |
| 4,353,605 A | 10/1982 | Chiba et al. |

FOREIGN PATENT DOCUMENTS

| JP | 42-2885 | 2/1967 |
| JP | 56-39623 | 4/1981 |
| JP | 61-7621 | 1/1986 |
| JP | 5-8043 | 2/1993 |
| JP | 5-50143 | 7/1993 |
| JP | 6-49825 | 7/1994 |
| JP | 8-219161 | 8/1996 |
| JP | 2000-110533 | 4/2000 |
| JP | 2001-323935 | 11/2001 |
| JP | 2004-108544 | 4/2004 |
| JP | 2005-90696 | 4/2005 |
| JP | 2005-180459 | 7/2005 |

Primary Examiner — Ching Chang
(74) Attorney, Agent, or Firm — Clark & Brody

(57) ABSTRACT

A needle roller bearing (21) as a roller bearing comprises an outer ring (22) formed by connecting a plurality of arc-shaped outer ring members in a circumferential direction, and a plurality of needle rollers (23) arranged along the inner diameter surface of the outer ring (22), and an oil groove (22i) extending in a circumferential direction so as to contain a position opposed to an opening (13e) of an oil path of a housing is formed in the outer diameter surface of the outer ring member.

22 Claims, 26 Drawing Sheets

ROLLER BEARING, CAMSHAFT SUPPORT STRUCTURE, AND INTERNAL COMBUSTION ENGINE

TECHNICAL FIELD

The present invention relates to a roller bearing supporting a camshaft, a crankshaft, and a rocker shaft for a car engine, a camshaft support structure and an internal combustion engine using the roller bearing.

BACKGROUND ART

A conventional camshaft support structure used for an internal combustion engine for a car and a two-wheeled motor vehicle is disclosed in Japanese Unexamined Patent Publication No. 2005-90696, for example. Referring to FIG. 44, the camshaft support structure described in the document comprises a camshaft 201 having a cam lobe 201a, a cylindrical journal part 201b supported by a roller bearing 202, and an end large diameter part 201c, a housing comprising a cylinder head 208 and a cap 209, and the roller bearing 202 including a plurality of rollers 203, roughly semi-cylindrical retainers 204 and 205, and roughly semi-cylindrical race plates 206 and 207, and supporting the camshaft 201 rotatably with respect to the housing.

Here, the outer diameter dimension of the journal part 201b is smaller than the maximum dimension of the outer diameter of the cam lobe 201a and the outer diameter dimension of the end large diameter part 201c. Therefore, the roller bearing 202 to be arranged at the journal part 201b to support the camshaft 201 rotatably cannot be inserted from the axial direction of the camshaft 201.

Thus, the roller bearing 202 has the plurality of rollers 203, the circumferentially split roughly semi-cylindrical retainers 204 and 205, and the circumferentially split roughly semi-cylindrical race plates 206 and 207 arranged between the cylinder head 208 and the cap 209. In addition, referring to FIG. 45, the race plate 207 has two projections 207a projecting from the circumferential each end to the radial outer side, and the cap 209 has recessions 209a corresponding to the projections 207a.

Thus, according to the document, when the projections 207a engage with the recessions 209a, the relative movement between the race plate 207 and the cap 209 is prevented in the circumferential direction and an axial direction during the rotation of the roller bearing 202. In addition, the same is true on the space between the race plate 206 and the cylinder head 208.

The race plates 206 and 207 having the above constitution are produced by pressing a steel plate such as cold rolled steel plate (SPC) in general. In addition, a heat treatment is performed in order to obtain predetermined mechanical property such as hardness after the predetermined configuration is provided.

According to the roller bearing 202 disclosed in the above document, the projection 207a is formed by applying force in the direction of radial outer side from the inner diameter surface of the race plate 207 so that the outer diameter surface thereof is protruded. As a result, a recession is formed in the inner diameter surface of the race plate 207 serving as a track surface of the roller 203, which causes vibration to be generated when the roller 203 passes through the recession, and the surface of the roller 203 to be abraded in an early stage, so that the smooth rotation of the roller 203 is hindered.

Furthermore, although the lubricant oil flows into the roller bearing 202 from an oil hole (not shown) provided in the race plates 206 and 207 or an oil hole (not shown) provided in the camshaft 201, the flow of the lubricant oil in the bearing is interrupted by the retainers 204 and 205 and the problem is that the lubricant oil cannot be uniformly supplied to the whole bearing.

In addition, this problem arises in the bearing supporting the crankshaft and the rocker shaft as well as the roller bearing that supports the camshaft.

In addition, a lubricating structure around the camshaft 201 described above is disclosed in Japanese Unexamined Patent Publication No. 2000-110533, for example. When the lubricating structure disclosed in this document is described with reference to FIG. 44, the camshaft 201 comprises an oil passage (not shown) extending in an axial direction, and a plurality of oil holes (not shown) extending from the oil passage to the surface of the journal part 201b. Meanwhile, a housing comprises a plurality of supply oil paths (not shown) through which lubricant oil is supplied from the outside to the position opposed to the journal part 201b and an oil groove (not shown). Thus, the lubricant oil supplied from the supply oil path provided in the housing is distributed to each part through the oil groove, the oil hole and the oil passage of the camshaft 201.

According to the lubricating structure disclosed in the Japanese Unexamined Patent Publication No. 2000-110533, when the oil groove is formed in the housing by cutting process, the number of production steps and production cost of the internal combustion engine are increased. This problem is serious in the engine having many cylinders. In addition, when the housing is produced by casting, deformation of a die due to heat becomes a serious problem. This will cause an error in the position and the configuration of the oil groove.

In addition, according to the above camshaft support structure, since the gap is formed between the camshaft 201 and the axial ends of the race plates 206 and 207, a part of the lubricant oil supplied from the oil supply path of the housing into the roller bearing 202 flows out through the gap and the amount of the lubricant oil reaching the oil hole of the camshaft 201 is reduced. As a result, since the amount of the lubricant oil distributed to each part through the oil passage is also reduced, a lubricating property is lowered as a whole.

In addition, since a load slanted to a certain direction is applied to the camshaft 201 at the time of rotation, the camshaft 201 is divided to a region in which a relatively large load (referred to as "load region" hereinafter) and a region in which only a relatively small load is applied (referred to as "non-load region" hereinafter) in its circumferential direction. Therefore, it is desirable that the lubricant oil supplied from the supply oil path of the housing is supplied more to the load region.

DISCLOSURE OF THE INVENTION

Thus, it is an object of the present invention to provide a roller bearing in which the number of production steps and the production cost are reduced and a lubricating property is excellent. In addition, it is an object to provide a camshaft support structure and a internal combustion engine in which the above roller bearing is used.

In addition, it is another object of the present invention to provide a roller bearing for supporting the camshaft of a car engine, in which the retention property of lubricant oil is improved. It is an object to provide a camshaft support structure and an internal combustion engine with a superior lubricating property and high reliability by employing the above roller bearing as the bearing supporting the camshaft.

In addition, it is still another object of the present invention to provide a roller bearing with a superior lubricating property by improving the retention property of lubricant oil of the roller bearing. In addition, it is an object to provide a camshaft support structure and an internal combustion engine with a superior lubricating property and high reliability by employing the above roller bearing as the bearing supporting the camshaft.

It is still another object of the present invention to provide a camshaft support structure in which the retention property of lubricant oil of a roller bearing is improved and the lubricant oil can be intensively supplied to a load region. In addition, it is an object of the present invention to provide an internal combustion engine comprising the above camshaft support structure.

Furthermore, it is still another object of the present invention to provide a roller bearing for supporting the camshaft of a car engine, in which the retention property of lubricant oil is improved.

A roller bearing according to the present invention comprises an outer ring formed by connecting a plurality of arc-shaped outer ring members in a circumferential direction, and a plurality of rollers arranged along the inner diameter surface of the outer ring. An oil groove extending in the circumferential direction is formed in the outer diameter surface of the outer ring member.

When the above roller bearing is used, it is not necessary to form an oil groove in the inner diameter surface of a housing. As a result, the number of production steps and the production cost of the housing can be reduced.

Preferably, a circumferential gap formed at the abutment parts of the adjacent outer ring members is relatively large at a region containing the oil groove, and relatively small at the other regions. Thus, the lubricant oil flowing in the oil groove can be prevented from flowing out in the axial direction through the circumferential gap between the adjacent outer ring members.

Preferably, the outer ring member includes a flange part projecting from an axial end to the radial inner side, and a bend part extending from the tip end of the flange part to the axial inner side. Thus, the inner diameter surface of the bend part functions as a sealing surface for preventing lubricant oil from flowing out of the inside of the bearing. Since the flange part projecting from the axial end to the radial inner side, and the bend part formed by bending the tip end of the flange part to the axial inner side are provided at the axial end of the outer ring member, the lubricant oil in the bearing can be prevented from flowing out through the axial gap. As a result, the roller bearing has a superior lubricating property.

Preferably, a gap δ between the inner diameter surface of the bend part and a phantom circle being internally in contact with the plurality of rollers satisfies that 5 µm≦δ≦50 µm. In order to reduce the amount of the lubricant oil flowing out of the inside of the bearing through the gap of the axial end, it is preferable that the axial gap of the roller bearing falls within the above range. In addition, when δ>50 µm, the function as the sealing surface for preventing the lubricant oil from flowing out is low. Meanwhile, when δ<50 µm, the bend part and the rotation shaft come in contact with each other at the time of the bearing rotation, which could hinder the smooth rotation.

Further preferably, the roller bearing further comprises an annular member for preventing the lubricant oil from flowing out of the inside of the bearing, at a position to be in contact with the inner diameter surface of the bend part. Thus, the lubricant oil can be further effectively prevented from flowing out.

According to one embodiment, the roller has a projection part projecting from an end face, the outer diameter surface of the bend part functions as a guide part for guiding the projection part, and the roller bearing is a full complement roller bearing in which the adjacent rollers are arranged so as to be in contact with each other. According to the above roller bearing, the bend part can guide the rotation of the roller. Therefore, the present invention is suitable for the full complement roller bearing. In addition, in the case of the full type roller, the load capacity of the roller bearing is increased.

Preferably, the outer ring member has a flange part projecting from ring member's axial end to the radial inner side, and a rigidity lowered part having relatively low rigidity is provided at least at the circumferential end of the flange part.

According to one embodiment, the projection height of the flange part at the rigidity lowered part is lower than that of the flange part at the other regions.

Preferably, a retainer retaining the interval of the adjacent rollers is provided. The retainer has an oil path penetrating in a radial direction. When the oil path penetrating in the radial direction is provided in the retainer, since the lubricant oil flowing in the roller bearing can be uniformly supplied to the whole bearing, the roller bearing has a superior lubricating property.

According to one embodiment, the retainer has a pair of ring parts, a plurality of column parts arranged between the pair of ring parts, and a pocket for holding the roller, between the adjacent column parts, and the oil path is provided in the column part. Further preferably, the column part further has an oil groove passing through the adjacent pockets in the circumferential direction.

According to another embodiment, the retainer has a plurality of independent pocket parts for holding the rollers, and a connection part connecting the plurality of pocket parts in the circumferential direction, and the oil path is provided between the adjacent pocket parts. According to still another embodiment, the retainer has two rows of the plurality of pockets for holding the rollers in the axial direction, and the oil path is provided between the two pocket rows.

A camshaft support structure according to the present invention comprises a camshaft, a housing containing the camshaft, and a roller bearing supporting the camshaft rotatably with respect to the housing. An opening of an oil path in which lubricant oil flows is provided in a region containing the camshaft of the housing. The roller bearing comprises an outer ring formed by connecting a plurality of arc-shaped outer ring members in a circumferential direction, and a plurality of rollers arranged along the inner diameter surface of the outer ring. An oil groove extending in the circumferential direction so as to contain the position opposed to the opening of the oil path is formed in the outer diameter surface of the outer ring member.

According to the above camshaft support structure, since the oil groove is formed in the outer diameter surface of the outer ring member, the number of production steps and the production cost of the housing can be reduced. Meanwhile, since the outer ring member can be produced by the progressive press and the like, the step of forming the oil groove can be easily added without increasing its cost.

In addition, according to the above roller bearing, the gap is provided at the abutment part between the adjacent outer ring members to some extent in view of the production error and thermal expansion and the like. Since the lubricant oil supplied from the oil path of the housing can flow into the bearing from this gap, the camshaft support structure has a superior lubricating property as compared with a bearing employing an integral type outer ring.

According to one embodiment, the oil groove is formed by a coining process. When the oil groove is formed by the coining process, the process can be performed with high accuracy.

Preferably, the outer ring member is divided into a center region in which a track surface contacting the roller is formed on outer ring member's inner diameter surface, and an end region adjacent to the center region, and the oil groove is arranged in the end region. Thus, when the oil groove is formed at the position away from the part serving as the track surface, the smooth rotation of the roller is implemented.

An internal combustion engine according to the present invention comprises a housing, a cylinder provided in the housing, a valve opening/closing an inlet path and an exhaust path continued to the cylinder, a camshaft controlling the timing of the opening/closing of the valve, and a roller bearing supporting the camshaft rotatably with respect to the housing. An opening of an oil path in which lubricant oil flows is provided in a region of the housing containing the camshaft. The roller bearing comprises an outer ring formed by connecting a plurality of arc-shaped outer ring members in a circumferential direction, and a plurality of rollers arranged along the inner diameter surface of the outer ring. An oil groove extending in the circumferential direction so as to contain the position opposed to the opening of the oil path is formed in the outer diameter surface of the outer ring member.

When the above camshaft support structure is employed, the internal combustion engine has a superior lubricating property and high reliability.

According to the present invention, the roller bearing can prevent the production number and production cost from increasing, and implement a superior lubricating property, and the camshaft support structure and the internal combustion engine are highly reliable by employing the above roller bearing.

A roller bearing according to the present invention comprises an outer ring formed by connecting a plurality of arc-shaped outer ring members in a circumferential direction, and a plurality of rollers arranged along the inner diameter surface of the outer ring. The outer ring member includes a flange part projecting from an axial end to the radial inner side, and a bend part extending from the tip end of the flange part to the axial inner side. The inner diameter surface of the bend part functions as a sealing surface for preventing lubricant oil from flowing out of the inside of the bearing.

According to the above constitution, since the outer ring is divided into the plurality of outer ring members, the roller bearing can be used in a part in which it cannot be inserted from the axial direction like the camshaft. In addition, since the flange part projecting from the axial end to the radial inner side, and the bend part formed by bending the tip end of the flange part to the axial inner side are provided, the lubricant oil in the bearing can be prevented from flowing out through the axial gap. Thus, the roller bearing has a superior lubricating property.

Preferably, a gap $\delta$ between the inner diameter surface of the bend part and a phantom circle being internally in contact with the plurality of rollers satisfies that $5 \mu m \leq \delta \leq 50 \mu m$. In order to reduce the amount of the lubricant oil flowing out of the inside of the bearing through the gap of the axial end, it is preferable that the axial gap of the roller bearing falls within the above range. In addition, when $\delta > 50 \mu m$, the function as the sealing surface for preventing the lubricant oil from flowing out is low. Meanwhile, when $\delta < 50 \mu m$, the bend part and the rotation shaft come in contact with each other at the time of the bearing rotation, which could hinder the smooth rotation.

Further preferably, the roller bearing further comprises an annular member for preventing the lubricant oil from flowing out of the inside of the bearing, at a position to be in contact with the inner diameter surface of the bend part. Thus, the lubricant oil can be further effectively prevented from flowing out.

According to one embodiment, the roller has a projection part projecting from an end face, the outer diameter surface of the bend part functions as a guide part for guiding the projection part, and the roller bearing is a full complement roller bearing in which the adjacent rollers are arranged so as to be in contact with each other. According to the above roller bearing, the bend part can guide the rotation of the roller. Therefore, the present invention is suitable for the full complement roller bearing. In addition, in the case of the full type roller, the load capacity of the roller bearing is increased.

A camshaft support structure comprises a camshaft, a housing containing the camshaft, and a roller bearing supporting the camshaft rotatably with respect to the housing according. The roller bearing comprises an outer ring formed by connecting a plurality of arc-shaped outer ring members in a circumferential direction, and a plurality of rollers arranged along the inner diameter surface of the outer ring. The outer ring member includes a flange part projecting from an axial end to the radial inner side, and a bend part formed by bending the tip end of the flange part to the axial inner side. The inner diameter surface of the bend part functions as a sealing surface for preventing lubricant oil from flowing out of the inside of the bearing.

According to the above camshaft support structure, since the amount of lubricant oil flowing out through the axial gap of the roller bearing is small, the lubricant oil supplied from the oil path of the housing mostly reaches the oil hole of the camshaft. As a result, the camshaft support structure has a superior lubricating property.

An internal combustion engine according to the present invention comprises a housing, a cylinder provided in the housing, a valve opening/closing an inlet path and an exhaust path continued to the cylinder, a camshaft controlling the timing of the opening/closing of the valve, and a roller bearing supporting the camshaft rotatably with respect to the housing. The roller bearing comprises an outer ring formed by connecting a plurality of arc-shaped outer ring members in a circumferential direction, and a plurality of rollers arranged along the inner diameter surface of the outer ring. The outer ring member includes a flange part projecting from an axial end to the radial inner side, and a bend part formed by bending the tip end of the flange part to the axial inner side. The inner diameter surface of the bend part functions as a sealing surface for preventing lubricant oil from flowing out of the inside of the bearing.

The internal combustion engine has a superior lubricating property and high reliability by employing the roller bearing and the camshaft support structure according to the present invention.

According to the present invention, since the lubricant oil can be prevented from flowing out through the axial gap of the roller bearing, the retention property of the lubricant oil of the roller bearing is improved. In addition, when the above roller bearing is employed as the bearing for supporting the camshaft, the camshaft support structure and the internal combustion engine have superior durability and high reliability.

A roller bearing according to the present invention comprises an outer ring formed by connecting a plurality of arc-shaped outer ring members in a circumferential direction, and a plurality of rollers arranged along the inner diameter surface of the outer ring. The outer ring member includes a flange part projecting from an axial end to the radial inner side, and a rigidity lowered part having relatively low rigidity is provided at least at the circumferential end of the flange part.

According to one embodiment, the projection height of the flange part at the rigidity lowered part is lower than that of the flange part at the other regions.

Since the above roller bearing is provided with the flange part at the axial end of the outer ring member, the gap between the outer ring member and the camshaft is reduced. As a result, the retention property of the lubricant oil is improved, and the roller bearing has a superior lubricating property. In addition, according to the roller bearing having the retainer retaining the interval of the adjacent rollers, the flange part can regulate the axial movement of the retainer.

Here, since the flange part is formed by bending the axial end of the outer ring member, the rigidity of the outer ring member is improved. As a result, it is likely that the circumferential ends of the outer ring member attacks the inner circumference of the housing and indentation (abrasion) is generated in the housing. When abrasion powder enters the needle roller bearing, the lubricant oil deteriorates in an early stage and the track surface of the outer ring member and the rolling surface of the needle roller are damaged, to considerably lower the lubricating property of the needle roller bearing. Thus, the projection height of the flange part at the circumferential end of the outer ring member is set relatively lower than the other parts to lower the rigidity at the circumferential ends, whereby the above problem can be avoided.

A camshaft support structure according to the present invention comprises a camshaft, a housing containing the camshaft, and a roller bearing supporting the camshaft rotatably with respect to the housing. The roller bearing comprises an outer ring formed by connecting a plurality of arc-shaped outer ring members in a circumferential direction, and a plurality of rollers arranged along the inner diameter surface of the outer ring. The outer ring member includes a flange part projecting from outer ring member's axial end to the radial inner side, and a rigidity lowered part having relatively low rigidity is provided at least at the circumferential end of the flange part.

An internal combustion engine according to the present invention comprises a housing, a cylinder provided in the housing, a valve opening/closing an inlet path and an exhaust path continued to the cylinder, a camshaft controlling the timing of the opening/closing of the valve, and a roller bearing supporting the camshaft rotatably with respect to the housing. The roller bearing comprises an outer ring formed by connecting a plurality of arc-shaped outer ring members in a circumferential direction, and a plurality of rollers arranged along the inner diameter surface of the outer ring. The outer ring member includes a flange part projecting from outer ring member's axial end to the radial inner side, and a rigidity lowered part having relatively low rigidity is provided at least at the circumferential end of the flange part.

When the above roller bearing is employed, the camshaft support structure and the internal combustion engine have superior lubricating property and high reliability.

According to the present invention, since the flange part is provided at the outer ring member, the retention property of the lubricant oil of the roller bearing is improved. In addition, since the rigidity lowered part is provided at the circumferential end, the circumferential end of the outer ring member is prevented from damaging the housing.

Furthermore, when the above roller bearing is employed as the bearing for supporting the camshaft, the camshaft support structure and the internal combustion engine have a superior lubricating property and high reliability.

A camshaft support structure according to the present invention comprises a camshaft, a housing containing the camshaft, and a roller bearing supporting the camshaft rotatably with respect to the housing. An opening of an oil path in which lubricant oil flows is provided in a region containing the camshaft of the housing. The roller bearing comprises an outer ring formed by connecting a plurality of arc-shaped outer ring members having an oil hole penetrating from the outer diameter side to the inner diameter side at a position opposed to the opening of the oil path, and a flange part projecting from its axial end to the radial inner side, and a plurality of rollers arranged along the inner diameter surface of the outer ring. The camshaft has a load region in which a large load is applied in the circumferential direction when the bearing is used, and a non-load region in which a relatively small load is applied when the bearing is used, and an opening part penetrating in the axial direction is provided in the flange part positioned in the load region when the outer ring member is incorporated in the camshaft.

According to the above roller bearing, the flange part is provided at the axial end of the outer ring member, the axial movement of the retainer can be regulated, and the gap between the outer ring member and the camshaft becomes small, so that the retention property of the lubricant oil is improved. In addition, when the opening part is provided at the flange part positioned in the load region, since the lubricant oil in the bearing flows out through the opening part mostly, the lubricant oil can be supplied to the load region intensively. As a result, when the above roller bearing is employed, the camshaft support structure has a superior lubricating property and high reliability.

Preferably, the opening part is arranged at a position away from a phantom line extending in the direction of a maximum load applied from the camshaft to the roller bearing. The rigidity of the roller bearing is lowered at the region containing the opening part to some extent. Thus, when the opening part is provided away from the position to which the maximum load is applied, the effect of the rigidity lowering can be reduced.

An internal combustion engine according to the present invention comprises a housing, a cylinder provided in the housing, a valve opening/closing an inlet path and an exhaust path continued to the cylinder, a camshaft controlling the timing of the opening/closing of the valve, and a roller bearing supporting the camshaft rotatably with respect to the housing. An opening of an oil path in which lubricant oil flows is provided in a region containing the camshaft of the housing. The roller bearing comprises an outer ring formed by connecting a plurality of arc-shaped outer ring members having an oil hole penetrating from the outer diameter side to the inner diameter side at a position opposed to the opening of the oil path, and a flange part projecting from the axial end to the radial inner side, and a plurality of rollers arranged along the inner diameter surface of the outer ring. The camshaft has a load region in which a large load is applied in the circumferential direction when the bearing is used, and a non-load region in which a relatively small load is applied when the bearing is used, and an opening part penetrating in the axial direction is provided in the flange part positioned in the load region when the outer ring member is incorporated in the camshaft.

When the above camshaft supporting structure is employed, the internal combustion engine has a superior lubricating property and high reliability.

According to the present invention, since the flange part is provided in the outer ring member, the lubricant oil retention property of the roller bearing is improved. In addition, since the opening part is provided in the flange part positioned in the load region, the lubricant oil can be intensively supplied to the load region. As a result, the lubricating property and cooling property of the roller bearing is improved. Furthermore, when the above roller bearing is employed as the bearing for supporting the camshaft, the camshaft support structure and the internal combustion engine have a superior durability and high reliability.

A roller bearing according to the present invention comprises an outer ring formed by connecting a plurality of arc-shaped outer ring members in a circumferential direction, a plurality of rollers arranged along the inner diameter surface of the outer ring, and a retainer retaining the interval of the adjacent rollers. The retainer has an oil path penetrating in a radial direction.

According to the above constitution, since the outer ring is divided into the plurality of outer ring members, the bearing can be used in a part to which it cannot be inserted in the axial direction like the camshaft. In addition, when the oil path penetrating in the radial direction is provided in the retainer, since the lubricant oil flowing in the roller bearing can be uniformly supplied to the whole bearing, the roller bearing has a superior lubricating property.

According to one embodiment, the retainer has a pair of ring parts, a plurality of column parts arranged between the pair of ring parts, and a pocket for holding the roller, between the adjacent column parts. More preferably, it further has an oil groove passing through the adjacent pockets in the circumferential direction.

According to another embodiment, the retainer has a plurality of independent pocket parts for holding the roller, and a connection part connecting the plurality of pocket parts in the circumferential direction, and the oil path is provided between the adjacent pocket parts. According to still another embodiment, the retainer has two rows of the plurality of pockets for holding the roller in the axial direction, and the oil path is provided between the two pocket rows.

Preferably, the outer ring member has an engagement click bent to the radial outer side, at the circumferential end so as to engage with the housing. Thus, the outer ring is prevented from rotating at the time of the bearing rotation.

According to the present invention, the roller bearing can surely position the outer ring member in the housing and has a superior lubricating property.

BEST MODE FOR CARRYING OUT THE INVENTION

Figure 42:
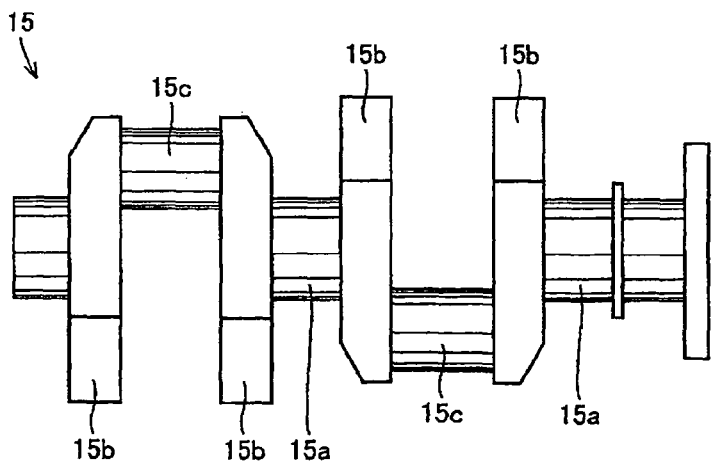
FIG. 42 is a view showing a crankshaft employed in the internal combustion engine in FIG. 41.
Figure 43:
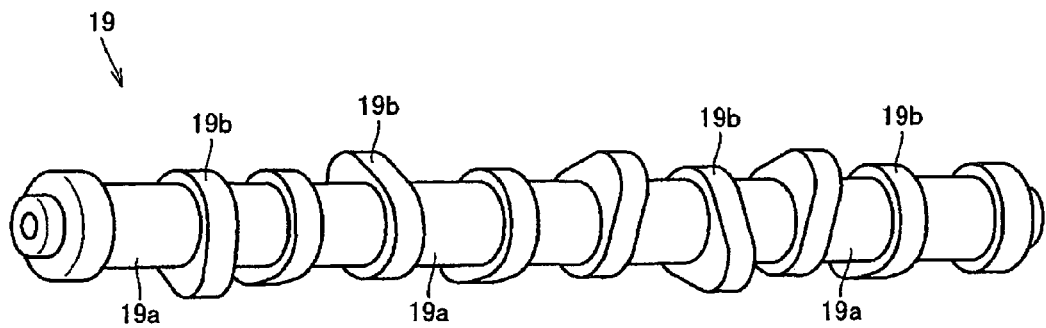
FIG. 43 is a view showing a camshaft employed in the internal combustion engine in FIG. 41.
Figure 44:
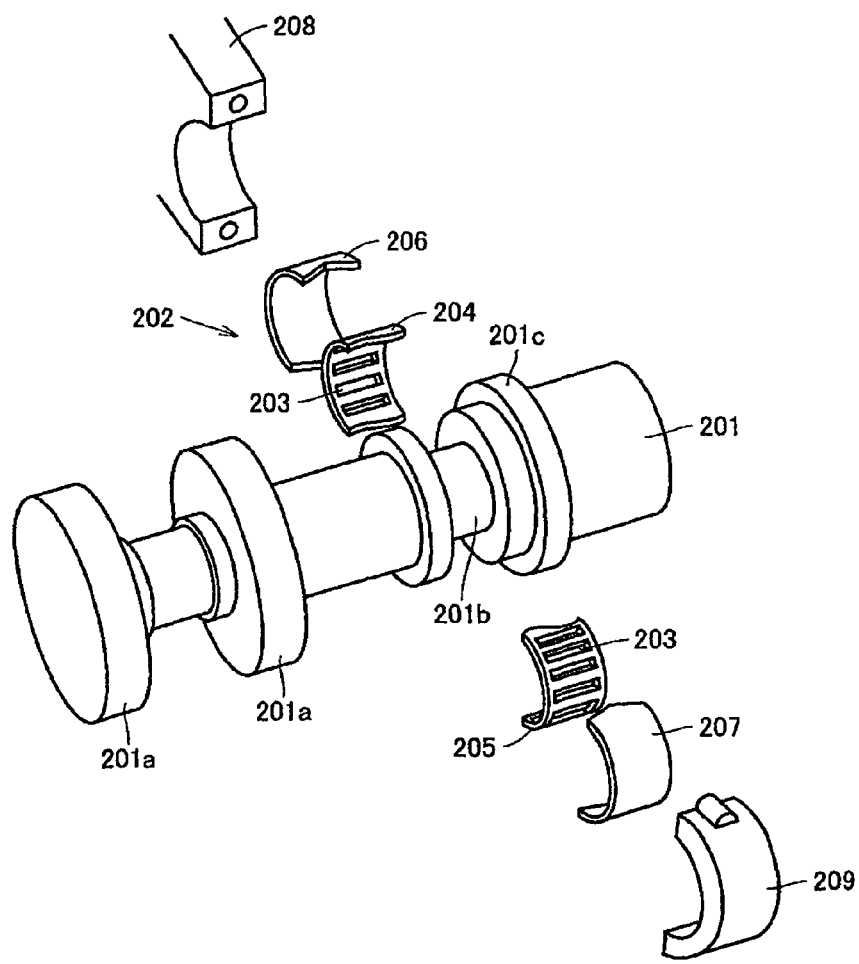
FIG. 44 is a view showing a conventional camshaft support structure.
Figure 45:
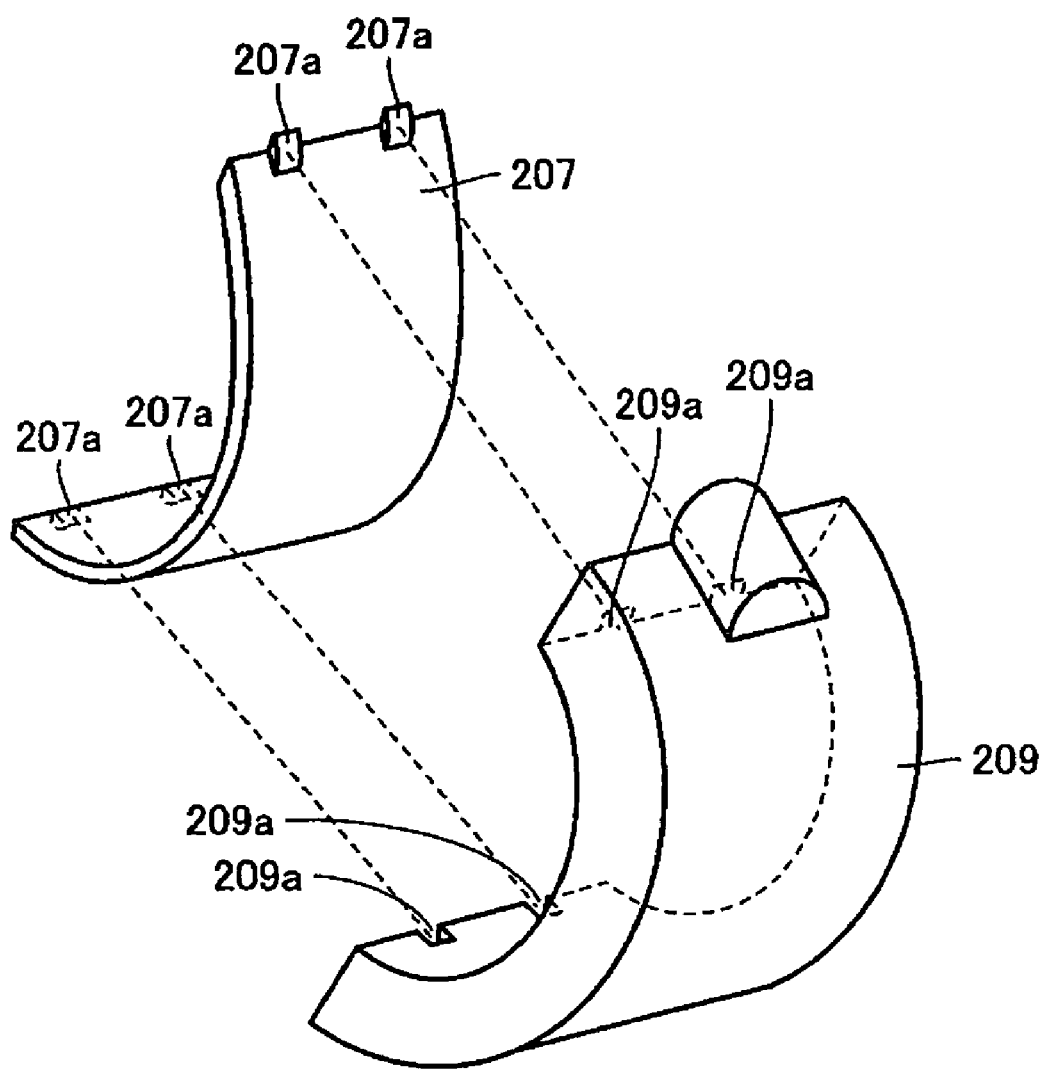
FIG. 45 is an enlarged view showing a race plate and a cap of a roller bearing shown in FIG. 44.

An internal combustion engine 11 according to one embodiment of the present invention will be described with reference to FIGS. 41 to 43 hereinafter. In addition, FIG. 41 is a sectional view showing one cylinder of the internal combustion engine 11 according to one embodiment of the present invention, FIG. 42 is a view showing a crankshaft 15 used in the internal combustion engine 11, and FIG. 43 is a view showing a camshaft 19 used in the internal combustion engine 11.

Figure 41:
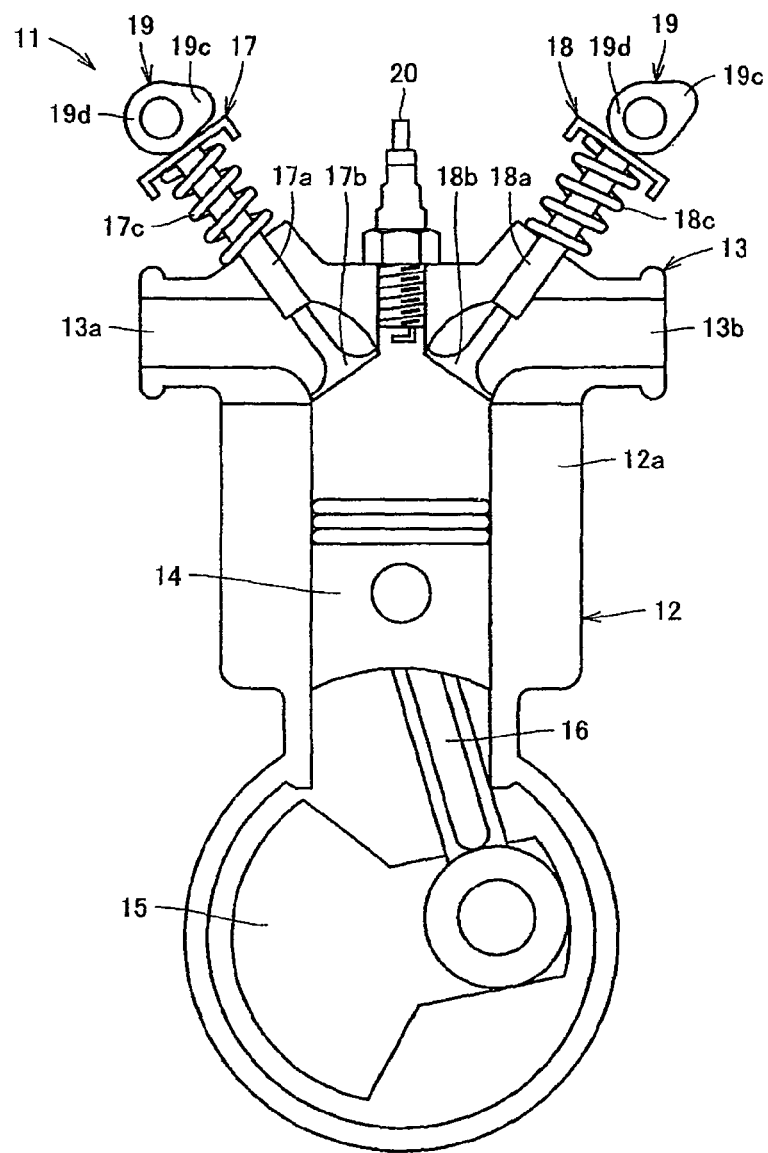
FIG. 41 is a sectional view showing one cylinder of an internal combustion engine according to one embodiment of the present invention.

First, referring to FIG. 41, the internal combustion engine 11 is a reciprocating engine comprising a cylinder block 12 and a cylinder head 13 as a housing, a motion converting mechanism for converting a reciprocal motion to a rotary motion, an inlet/exhaust mechanism for inletting mixture gas and exhausting combustion gas, and a spark plug 20 as an ignition device.

The motion converting mechanism comprises a piston 14 housed in the cylinder block 12 and reciprocating in a cylinder 12a provided in the cylinder block 12, a crankshaft 15 connected to a transmission (not shown) through a flywheel (not shown) and a clutch (not shown), and a con rod 16 having one end connected to the piston 14 and the other end connected to the crankshaft 15 and converting the reciprocal motion of the piston 14 to the rotary motion of the crankshaft 15.

The inlet/exhaust mechanism comprises an inlet path 13a and an exhaust path 13b formed in the cylinder head 13 and continued to the cylinder 12a, an inlet valve 17 serving as a valve disposed between the cylinder 12a and the inlet path 13a, an exhaust valve 18 serving as a valve disposed between the cylinder 12a and the exhaust path 13b, and a camshaft 19 controlling the opening and closing timings of the inlet valve 17 and the exhaust valve 18.

The inlet valve 17 includes a valve stem 17a, a valve head 17b provided at one side end of the valve stem 17a, and a valve spring 17c forcing the inlet valve 17 to close the exhaust path 13a, and the camshaft 19 is connected to the other side end of the valve stem 17a. In addition, since the exhaust valve 18 has the same constitution as that of the inlet valve 17, its description will not be reiterated.

Referring to FIG. 42, the crankshaft 15 used in the internal combustion engine 11 has a shaft part 15a, a crank arm 15b, and a crank pin 15c for arranging the con rod 16 between the adjacent crank arms 15b. The shaft part 15a of the crankshaft 15 is rotatably supported by a needle roller bearing 21 according to one embodiment of the present invention as will be described below. In addition, the number of the crank pin 15c is the same as that of the cylinder of the internal combustion engine 11.

Referring to FIG. 43, the camshaft 19 used in the internal combustion engine 11 has a shaft part 19a, and a plurality of cams 19b. The shaft part 19a is rotatably supported by the needle roller bearing 21 according to one embodiment of the present invention as will be described below. The camshaft 19 is connected to the crankshaft 15 by a timing belt (not shown) and rotates as the crankshaft 15 rotates.

Since the cam 19b is connected to the inlet valve 17 or the exhaust valve 18, the number thereof is the same as the number of the valves 17 and 18. In addition, as shown in FIG. 41, the cam 19b includes a large diameter part 19c having a relatively large diameter and a small diameter part 19d having a relatively small diameter, and as shown in FIG. 43, the plurality of cams 19b are arranged so that the positions of the large diameter parts 19c are shifted in the circumferential direction. Thus, the valves 17 and 18 connected to the plurality of cams 19b can be opened and closed at different timings.

In addition, the internal combustion engine 11 is a DOHC (Double Over Head Camshaft) type engine in which the camshaft 19 is arranged on the upper side of the cylinder head 13 and on each side of the inlet valve 17 and the exhaust valve 18.

Next, the operation principle of the internal combustion engine will be described.

First, the internal combustion engine 11 is a four-cycle engine comprising four steps of an inlet step, a compression step, a combustion step and an exhaust step when it is assumed that a step in which the piston 14 moves between an uppermost position (top dead center) and a lowermost position (bottom dead center) in the cylinder 12a is one step.

In the inlet step, the piston 14 moves from the top dead center to the bottom dead center while the inlet valve 17 is open and the exhaust valve 18 is closed. Thus, since the inner volume of the cylinder 12a (upper space of the piston 14) is increased and a pressure thereof is lowered, the mixture gas is supplied from the inlet path 13a into the cylinder 12a. In addition, the mixture gas is a mixture of air (oxygen) and atomized gasoline.

In the compression step, the piston 14 moves from the bottom dead end to the top dead end while the inlet valve 17 and the exhaust valve 18 are closed. Thus, the inner volume of the cylinder 12a is reduced and the inner pressure is increased.

In the combustion step, the spark plug 20 is ignited while the inlet valve 17 and the exhaust valve 18 are closed. Then, the compressed mixture gas is burned and expands rapidly, whereby the piston 14 is pulled down from the upper dead center to the bottom dead center. This force is transmitted to the crankshaft 15 through the con rod 16 as a rotary motion, whereby a driving force is generated.

In the exhaust step, while the inlet valve 17 is closed and the exhaust valve 18 is open, the piston 14 moves from the bottom dead center to the top dead center. Thus, the inner volume of the cylinder 12*a* is reduced and the combustion gas is discharged to the exhaust path 13*b*. In addition, after the piston 14 reaches the top dead center in this step, the cycle is returned to the inlet step.

In addition, in the above each step, the term "the inlet valve 17 is open" means that the large diameter part 19*c* of the cam 19*b* abuts on the inlet valve 17 and the inlet valve 17 is pressed downward against the valve spring 17*c*, and the term "the inlet valve 17 is closed" means that the small diameter part 19*d* of the cam 19*b* abuts on the inlet valve 17 and the inlet valve 17 is pushed upward by the restoring force of the valve spring 17*c*. In addition, since the same is true on the exhaust valve 18, its description will not be reiterated.

In the above steps, the driving force is generated only in the combustion step and in the other steps, the piston 14 is reciprocally moved by the driving force generated in the cylinder. Thus, in order to maintain the smooth rotation of the crankshaft 15, it is preferable that the timing of the combustion step is differentiated by the plurality of cylinders.

Next, a description will be made of the needle roller bearing 21 as a roller bearing according to one embodiment of the present invention, and a camshaft support structure using the needle roller bearing 21 with reference to FIGS. 1 to 10. In addition, FIGS. 1 and 8 to 10 are views showing states before and after the camshaft support structure according to one embodiment of the present invention is incorporated, and FIGS. 2 to 7 are views showing components of the needle roller bearing 21 according to one embodiment of the present invention.

Figure 1:
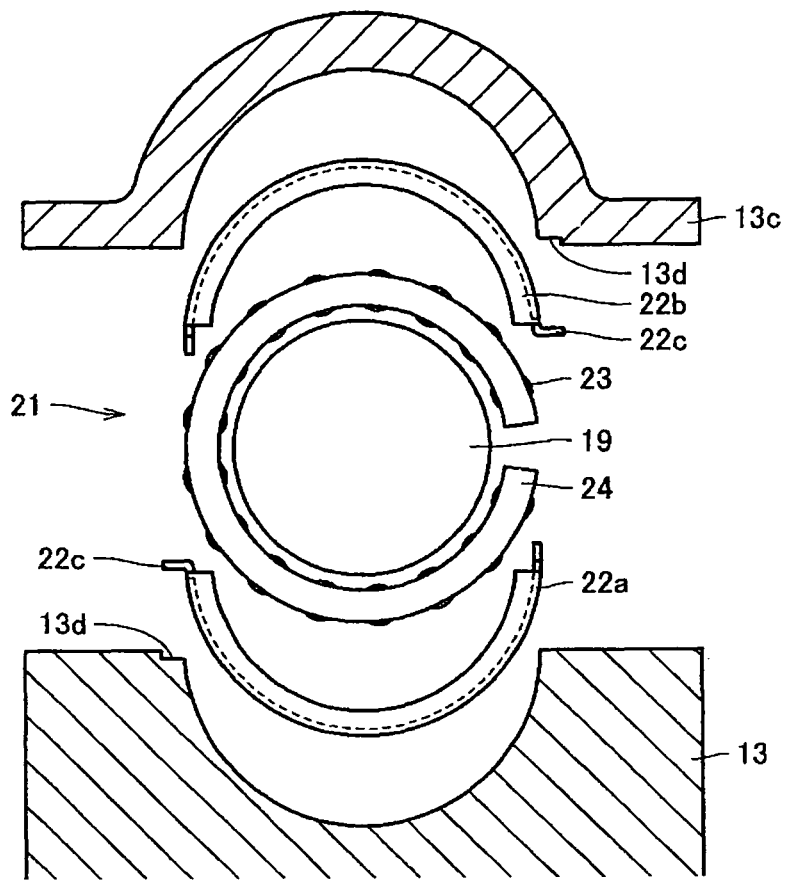
FIG. 1 is a view showing a state before a camshaft support structure according to one embodiment of the present invention is incorporated.

First, referring to FIG. 1, the camshaft support structure according to one embodiment of the present invention comprises the camshaft 19, the cylinder head 13 and a bearing cap 13*c* as a housing for holding the camshaft 19, and the needle roller bearing 21 supporting the camshaft 19 rotatably with respect to the housing.

The needle roller bearing 21 has an outer ring 22 formed by connecting arc-shaped outer diameter members 22*a* and 22*b* in a circumferential direction, a plurality of needle rollers 23 arranged along the inner diameter surface of the outer ring 22, and a retainer 24 having a split line provided at one position on its circumference and extending in a bearing axial direction, and retaining the intervals of the plurality of needle rollers 23.

In addition, as the bearing that supports the camshaft 19, the needle roller bearing 21 is employed in general. According to the needle roller bearing 21, since the needle roller 23 and a track surface are linearly in contact with each other, high-load capacity and high rigidity are provided in spite of its small bearing projected area. Therefore, while the load capacity is maintained, the thickness of the shaft part 19*b* in the radial direction can be reduced, which is preferable.

Figure 2:
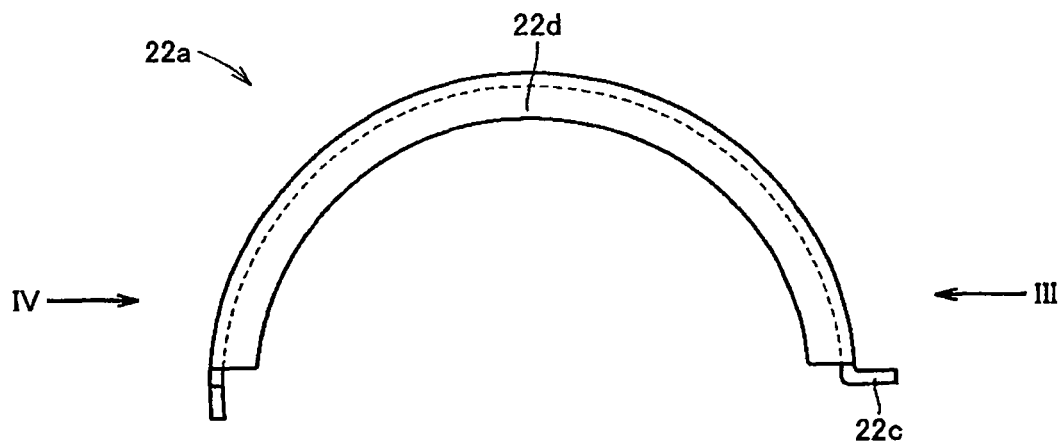
FIG. 2 is a view showing an outer ring member of a roller bearing according to one embodiment of the present invention.
Figure 3:
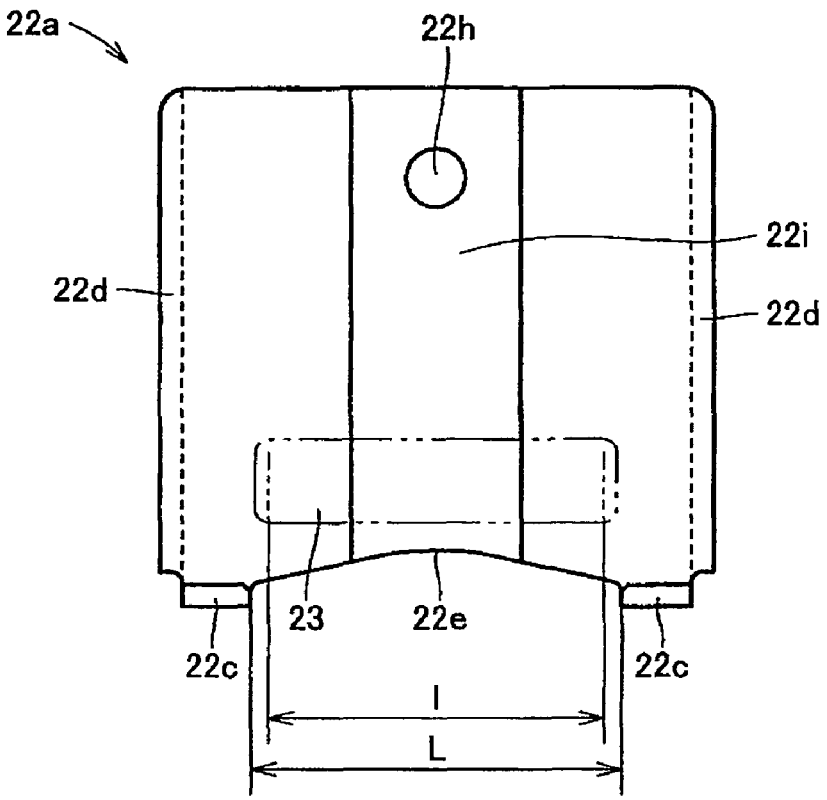
FIG. 3 is a view taken from III direction in FIG. 2.
Figure 4:
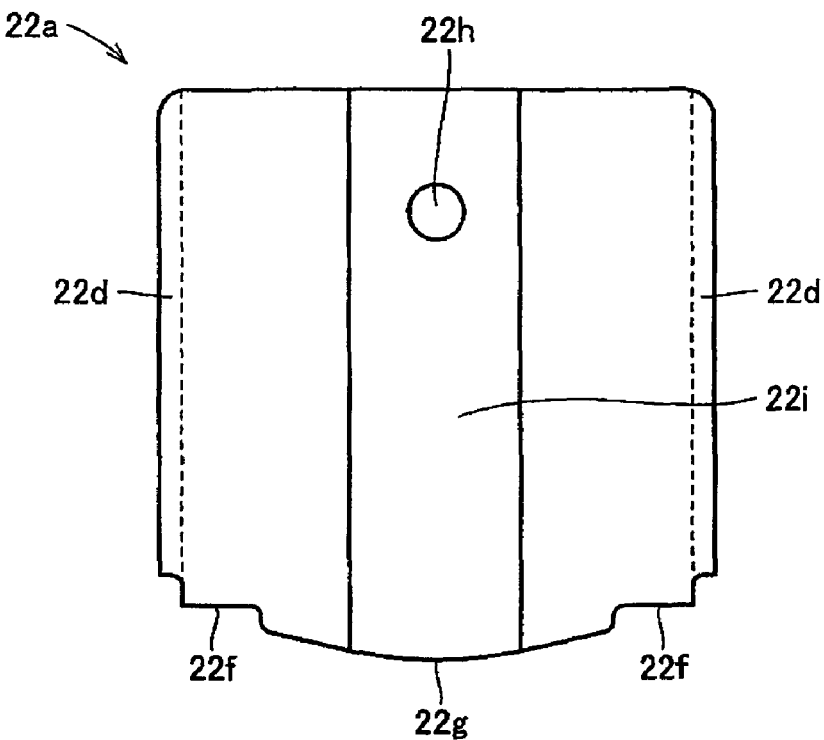
FIG. 4 is a view taken from IV direction in FIG. 2.
Figure 5:
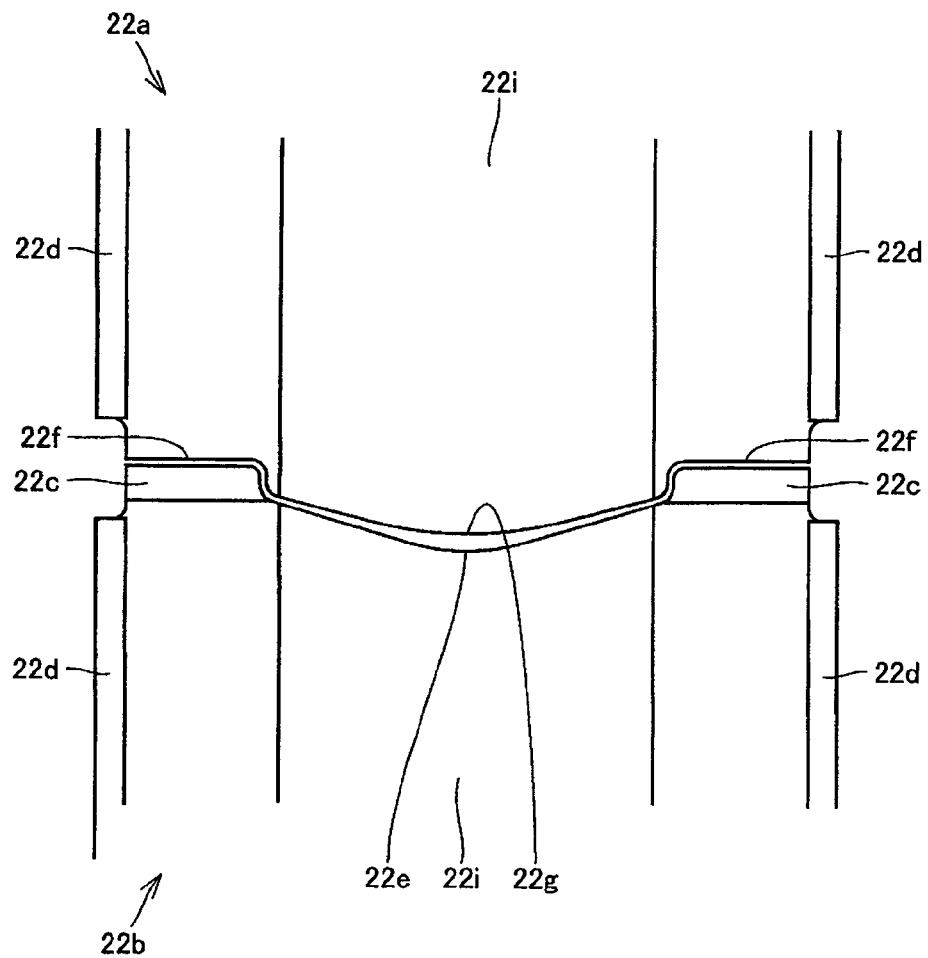
FIG. 5 is an enlarged view showing an abutment part of the adjacent outer ring members.

The outer diameter member 22*a* will be described with reference to FIGS. 2 to 5. In addition, FIG. 2 is a side view showing the outer diameter member 22*a*, FIG. 3 is a view taken from III direction in FIG. 2, FIG. 4 is a view taken from IV direction in FIG. 2, and FIG. 5 is an enlarged view showing the abutment part of the outer diameter members 22*a* and 22*b*. In addition, since the outer diameter member 22*b* has the same configuration as that of the outer diameter member 22*a*, its description will not be reiterated.

First, referring to FIG. 2, the outer diameter member 22*a* has a semicircular configuration having a center angle of 180° and includes an engagement click 22*c* provided one side end in the circumferential direction and bent to the radial outer side, and a flange part 22*d* provided at axial each end and projecting therefrom to the radial inner side. The engagement click 22*c* engages with the cylinder head 13 to prevent the outer ring member 22*a* from rotating with respect to the housing. The flange part 22*d* regulates the movement of the retainer 24 in the axial direction and improves the lubricant oil retention property of the bearing. Thus, the two outer diameter members 22*a* and 22*b* are connected in the circumferential direction to form the annular outer ring 22. In addition, the axial center of the inner diameter surface of the outer ring 22 functions as the track surface of the needle roller 23.

In addition, referring to FIG. 3, the two engagement clicks 22*c* are provided at the axial both ends, at one circumferential side end of the outer diameter member 22*a*, and a roughly V-shaped recession part 22*e* recessed in the circumferential direction is formed between the two engagement clicks 22*c*. In addition, the two engagement clicks 22*c* are arranged at axial both ends, not at the axial center serving as the track surface of the outer diameter member 22*a*, and arranged on a line parallel to the rotation axis of the needle roller bearing 21. That is, a length L between the two engagement clicks 22*c* is set so as to be longer than an effective length l of the needle roller 23. In addition, the term "effective length of the roller" in this specification means the length of the roller with the exception of chamfered parts at both ends.

In addition, referring to FIG. 4, the other circumferential side end of the outer diameter member 22*a* has two flat parts 22*f* each having the same width as the axial width of the engagement click 22*c*, at the axial both ends, and a roughly V-shaped projection part 22*g* having an arc-shaped tip end and projecting in the circumferential direction, between the two flat parts 22*f*. In addition, the recession part 22*e* receives the projection part 22*g* of the adjacent outer diameter member when the outer diameter members 22*a* and 22*b* are connected in the circumferential direction. Thus, since the configuration of the abutment part is in the form of the roughly V shape, the needle roller 23 can rotate smoothly. In addition, the configuration of the abutment part of the outer ring members 22*a* and 22*b* is not limited to the roughly V shape and it may be any configuration such as a roughly W shape as long as the needle roller 23 can rotate smoothly.

In addition, referring to FIGS. 3 and 4, in the outer diameter surface of the outer ring member 22*a*, an oil groove 22*i* is provided in the axial center and extends in the circumferential direction, and an oil hole 22*h* penetrating the bottom wall of the oil groove 22*i* from the outer diameter side to the inner diameter side is provided. The oil groove 22*i* is provided so as to include the position opposed to the opening part of an oil path provided in the housing (not shown), and the lubricant oil from the opening part is supplied from the oil hole 22*h* and the abutment part of the adjacent outer ring members 22*a* and 22*b* into the bearing through the oil groove 22*i*.

Referring to FIG. 5, a certain gap is formed at the abutment part of the adjacent outer diameter members 22*a* and 22*b* in the circumferential direction in view of thermal expansion and a production error of the outer diameter members 22*a* and 22*b*. Here, this circumferential gap is set so as to be relatively large in a region containing the oil groove 22*i*, and to be relatively small in other regions. According to this embodiment, the circumferential gap at the axial center is large, and the circumferential gap at axial both ends is small.

When the circumferential gap is large in the region containing the oil groove 22*i*, the amount of the lubricant oil supplied into the bearing is increased. As a result, the lubricating property of the needle roller bearing 21 is improved.

Meanwhile, when the circumferential gap is small in the region in which the oil groove 22i is not formed, the lubricant oil is prevented from flowing out in the axial direction through this gap.

In addition, the amount of the circumferential gap in the region containing the oil groove 22i and the other regions are not necessarily the same, and they may be different by location. According to this embodiment, the circumferential gap is the largest at the axial center, and gradually reduced toward axial both ends, and constant outside the oil groove 22i.

Figure 6:
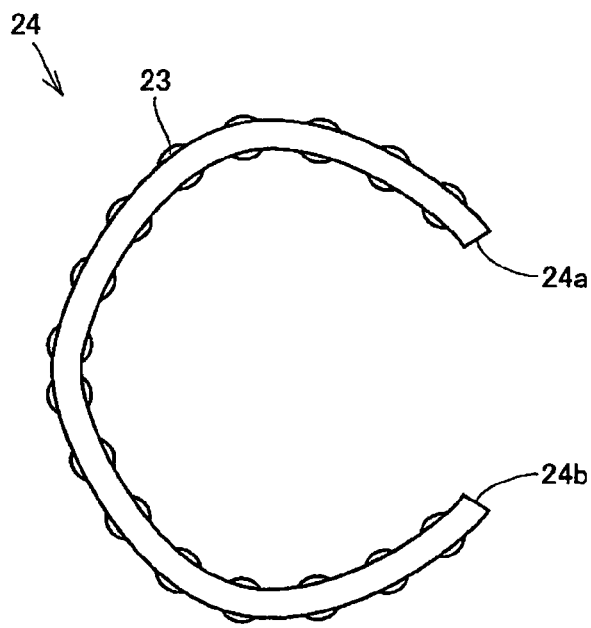
FIG. 6 is a side view showing a retainer of the roller bearing according to one embodiment of the present invention.
Figure 7:
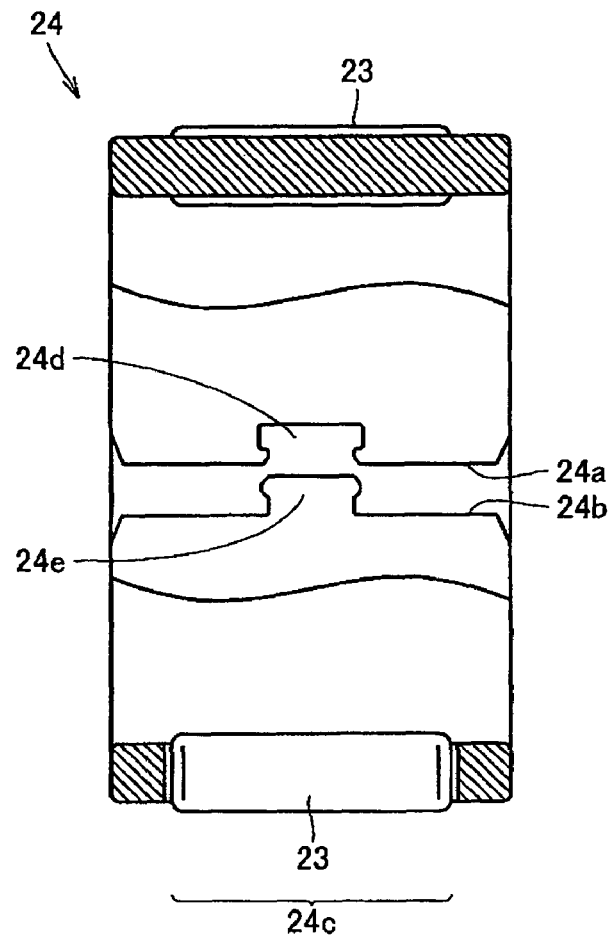
FIG. 7 is a partial sectional view including a split part of the retainer in FIG. 6.

Next, the retainer 24 will be described with reference to FIGS. 6 and 7. In addition, FIG. 6 is a side view showing the retainer 24 and FIG. 7 is a partially sectional view showing a split part of the retainer 24. Referring to FIGS. 6 and 7, the retainer 24 has a roughly C shape in which a split line extending in the axial direction is provided at one position on the circumference, and pockets 24c for housing the needle rollers 23 are provided at the same intervals in the circumferential direction. In addition, the retainer 24 is formed of a resin material by injection molding.

In addition, a recession part 24d is provided at one circumferential cut end face 24a of the split part, and a projection part 24e corresponding to the recession part 24d is provided at the other circumferential cut end face 24b, and when the recession part 24d engages with the projection part 24e, the annular retainer 24 is provided. In addition, according to this embodiment, the width of the projection part 24e at the tip end is set so as to be larger than that at the root part, and the width of the recession part 24d at an opening part is set so as to be smaller than that at an innermost part. Thus, the recession part 24d and the projection part 24e surely engage with each other.

Next, a process for incorporating the needle roller bearing 21 in the camshaft 19 will be described with reference to FIGS. 1 and 8 to 10.

First, the needle roller 23 is incorporated in the pocket 24c of the retainer 24. Then, the split part of the retainer 24 is elastically enlarged using the elasticity of the retainer 24, and mounted on the camshaft 19. Then, the recession part 24d and the projection part 24e engage with each other so that the retainer 24 is fixed.

Then, the one outer diameter member 22a, the camshaft 19 around which the retainer 24 is wound and fixed, the other outer diameter member 22b, and the bearing cap 13c are sequentially incorporated on the cylinder head 13, and then the cylinder head 13 and the bearing cap 13c are fixed by a bolt and the like. At this time, they are arranged such that the recession part 22e of the outer diameter member 22a abuts on the projection part 22g of the outer diameter member 22b, and the projection part 22g of the outer diameter member 22a abuts on the recession part 22e of the outer diameter member 22b.

The engagement click 22c of the outer diameter member 22a is arranged so as to engage with an engagement groove 13d provided in the cylinder head 13 to abut on the bearing cap 13c, and the engagement click 22c of the outer diameter member 22b is arranged so as to engage with an engagement groove 13d provided in the bearing cap 13c to abut on the cylinder head 13. Thus, the outer diameter members 22a and 22b are prevented from rotating in the housing during the bearing rotation.

Here, the abutment surface between the cylinder head 13 and the bearing cap 13c is parallel to the axial direction of the camshaft 19, that is, the rotation axis of the bearing in general. Thus, when the two engagement clicks 22c provided in the circumferential end of each of the outer diameter members 22a and 22b are arranged so as to be parallel to the rotation axis of the needle roller bearing 21, the engagement click 22c can engage with the space between the cylinder head 13 and the bearing cap 13c.

Figure 8:
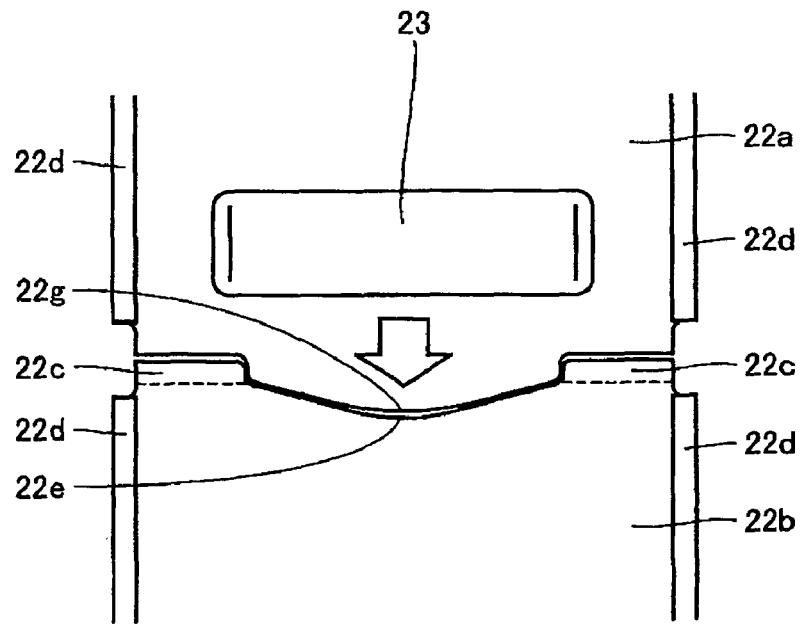
FIG. 8 is an enlarged view showing an abutment part when the outer ring members shown in FIG. 2 abut on each other.
Figure 9:
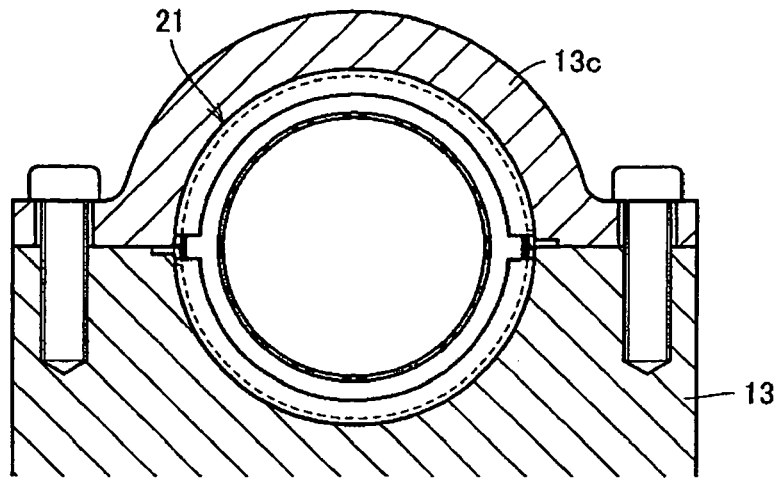
FIG. 9 is an axial sectional view showing a state after the incorporation of the camshaft support structure in FIG. 1.
Figure 10:
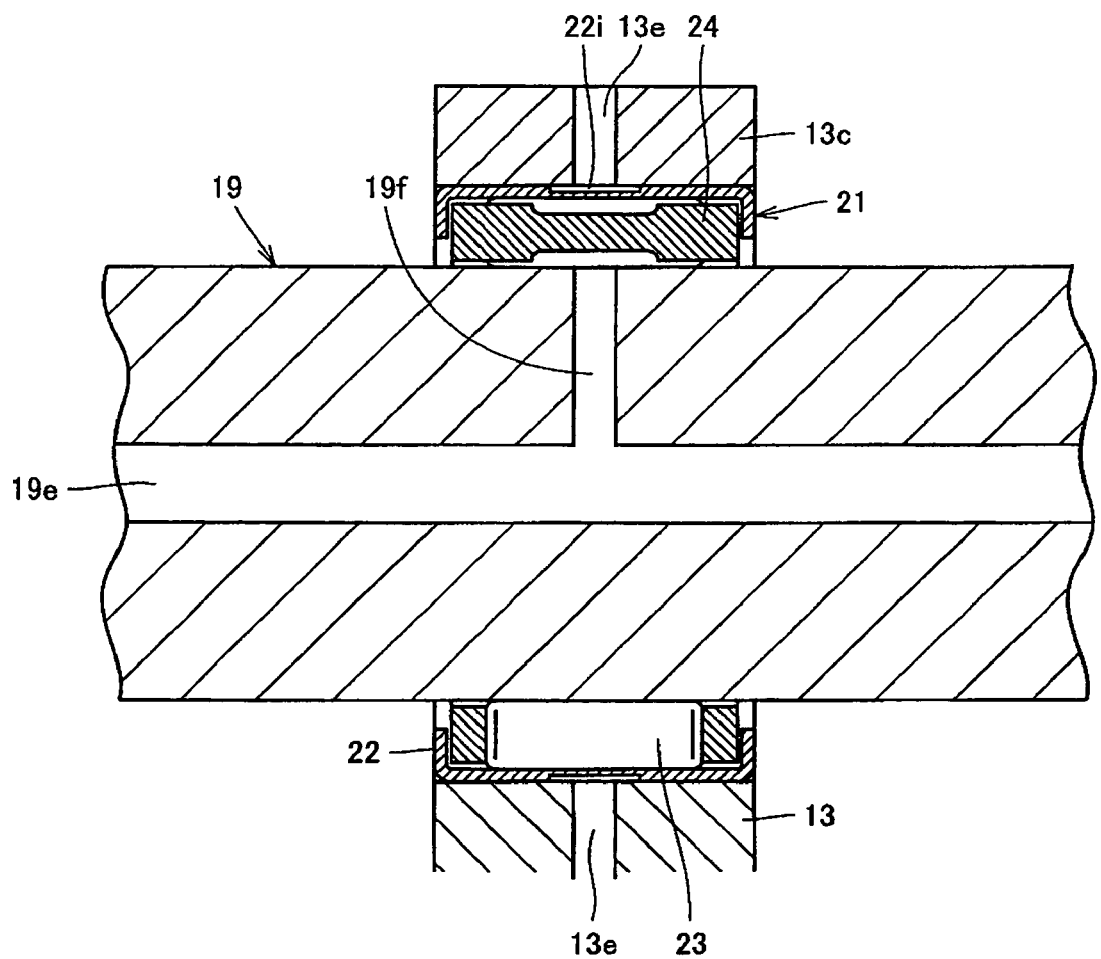
FIG. 10 is a radial sectional view showing the state after the incorporation of the camshaft support structure in FIG. 1.

In addition, referring to FIG. 8, the needle roller bearing 21 is arranged such that the rotation direction of the camshaft 19, that is, the revolution direction of the needle roller 23 coincides with the projection direction of the projection parts 22g of the outer diameter members 22a and 22b. Thus, the needle roller 23 can rotate smoothly.

When the revolution direction of the needle roller 23 is opposite to the projection direction of the projection parts 22g of the outer diameter members 22a and 22b, the needle roller 23 collides against the tip end of the projection part 22g of the outer diameter members 22a or 22b, which could cause vibration and the damage of the needle roller 23.

Furthermore, an opening 13e of the oil path for supplying the lubricant oil to the region in which the camshaft is housed is provided in the cylinder head 13 and the bearing cap 13c of the housing. In addition, an oil passage 19e extending in the axial direction, and an oil hole 19f extending toward the shaft part 19a are formed in the camshaft 19. Thus, when the needle roller bearing 21 is incorporated, the oil groove 22i formed in the outer diameter surfaces of the outer ring members 22a and 22b are arranged so as to be opposed to the opening 13e.

According to the above assembling process, since the camshaft 19, the outer ring 22, the retainer 24 and the housing are arranged concentrically, the needle roller 23 of the needle roller bearing 21 can stably rotate. In addition, according to the needle roller bearing 21 having the above constitution, since the outer ring 22 is split into the two outer diameter members 22a and 22b, and the retainer is split at one circumferential position, it can be mounted from the radial direction of the supporting part, so that it can be employed as the bearing supporting the shaft part 19b of the camshaft 19.

In addition, when the oil grooves 22i are provided in the outer diameter surfaces of the outer ring members 22a and 22b, the lubricant oil from the opening 13e is supplied from the oil hole 22h and the abutment part of the adjacent outer ring members 22a and 22b into the bearing through the oil groove 22i, and distributed to each part through the oil hole 19f and the oil passage 19e of the camshaft 19. In addition, it is considered that other paths of the lubricant oil contrary to the above includes a path in which the lubricant oil from the oil hole 19f of the camshaft 19 is discharged from the opening 13e to the oil path of the housing through the oil hole 22h of the needle roller bearing 21, the abutment part of the adjacent outer ring members 22a and 22b, and the oil groove 22i, and a path in which the lubricant oil flows from the opening 13e through the oil groove 22i and returns to the oil path of the housing through the opening 13e provided another position.

Thus, when the oil groove 22i is formed in each of the outer diameter surfaces of the outer ring members 22a and 22b and the gap is provided between the housing and the needle roller bearing 21 for the lubricant oil, the camshaft support structure has a superior lubricating property and the internal combustion engine having the above camshaft support structure is highly reliable. In addition, when the oil hole 22h is provided in the oil groove 22i, since it is not necessary to align the opening 13e of the housing with the oil hole 22h, an assembling property is improved and the versatility of the bearing is enhanced. When the present invention is applied to the split type outer ring 22 having the gap at the abutment part, a greater effect can be expected.

According to the above needle roller bearing 21, the lubricant oil supplied from the oil holes 22h provided in the outer ring members 22a and 22b is discharged from the oil hole 19f provided in the camshaft 19 through the inside of the needle roller bearing 21. However, in the case where the lubricant oil cannot pass through the inside of the bearing, the lubricant oil remaining in the bearing inside flows outward from the space between the outer ring members 22a and 22b and the camshaft 19, which does not contribute to the lubrication of the needle roller bearing 21.

Thus, retainers shown in FIGS. 11 to 15 are employed. In addition, since the base configuration of the retainer shown in FIGS. 11 to 15 is similar to that of the retainer 24 shown in FIGS. 6 and 7, the description of the similar part is not reiterated and a different point will be described mainly.

Figure 11:
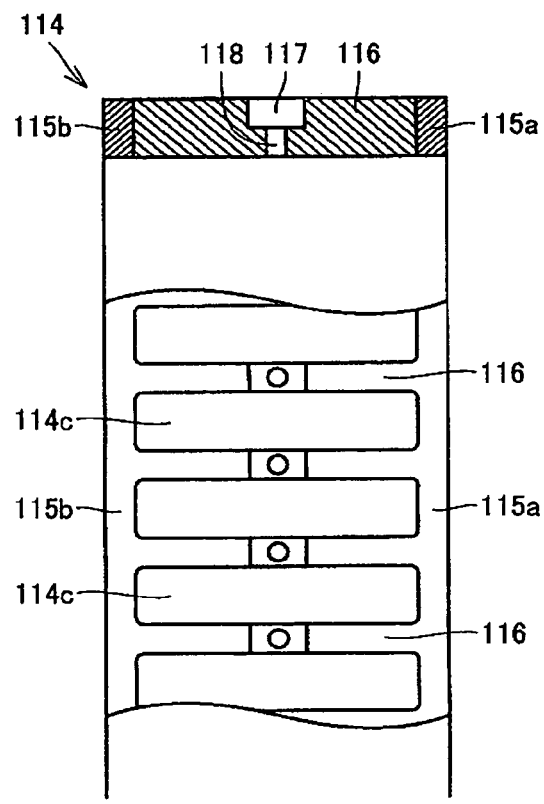
FIG. 11 is a view showing a retainer of the roller bearing taken from the radial outer side according to one embodiment of the present invention, in which an oil path penetrates in a radial direction as one example.

First, referring to FIG. 11, a retainer 114 has a pair of ring parts 115a and 115b, and a plurality of column parts 116 provided between the pair of rings 115a and 115b, and the column parts 116 connects the right and left ring parts 115a and 115b, whereby the integral type retainer 114 is formed. In addition, cut parts 114a and 114b are provided at one part of the ring parts 115a and 115b, respectively, and 114c is formed between the adjacent column parts 116.

Furthermore, the column part 116 has an oil groove 117 passing through the adjacent 114c circumferentially, and an oil path 118 penetrating the column part 116 in the radial direction. In addition, the oil groove 117 is formed in the axial center of the column part by sinking the outer diameter surface thereof, and the oil path 118 penetrates the bottom wall of the oil groove 117 toward the inner diameter side.

Thus, when the oil groove 117 and the oil path 118 are provided in the retainer 114 to increase the amount of the lubricant oil flowing in the bearing, the needle roller bearing 21 has a superior lubricating property.

In addition, although the oil groove 117 and the oil path 118 are formed in the axial center of the column part 116 in the retainer 114 shown in FIG. 11, they can be formed at any position. In addition, although the oil path 118 has a circular section in the above case, it may has any configuration such as a rectangular section.

Figure 12:
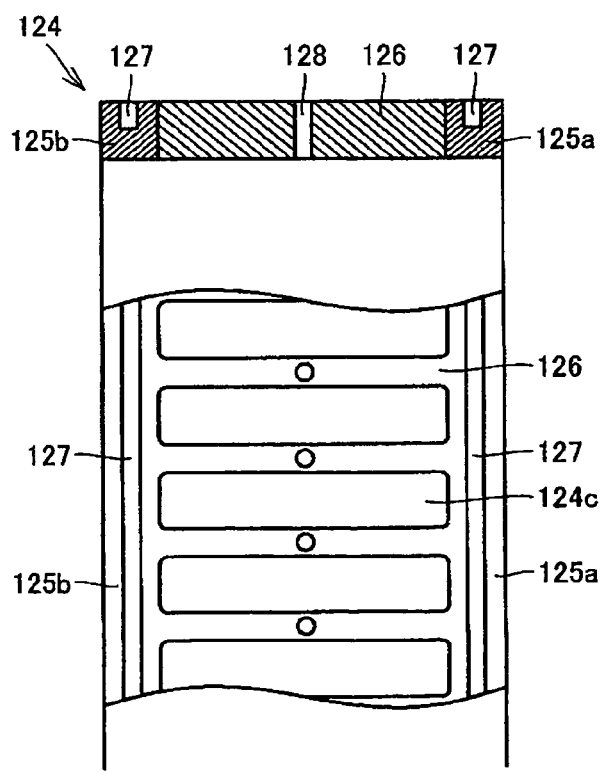
FIG. 12 is a view showing a retainer of the roller bearing taken from the radial outer side according to one embodiment of the present invention, in which an oil groove is provided in the outer diameter surface of a ring part as another example.

Then, referring to FIG. 12, a retainer 124 has a pair of ring parts 125a and 125b, and a plurality of column parts 126 arranged between the pair of ring parts 125a and 125b, and a pocket 124c for housing a needle roller 23 is formed between the adjacent column parts 126. Thus, oil grooves 127 extending in the circumferential direction are provided in the outer diameter surfaces of the pair of ring parts 125a and 125b, and an oil path 128 penetrating in the radial direction is provided in the axial center of the column part 126.

The retainer 124 having the above constitution is the variation of the retainer 114 shown in FIG. 11, in which the oil groove 127 and the oil path 128 are provided at different positions. In addition, although the oil grooves 127 are provided in the right and left ring parts 125a and 125b in the case shown in FIG. 12, it may be provided at one part. In addition, although the oil grooves 127 are provided in the outer diameter surfaces of the ring parts 125a and 125b in the above case shown in FIG. 12, they may be provided in the inner diameter surface or axial outer end surfaces.

Figure 13:
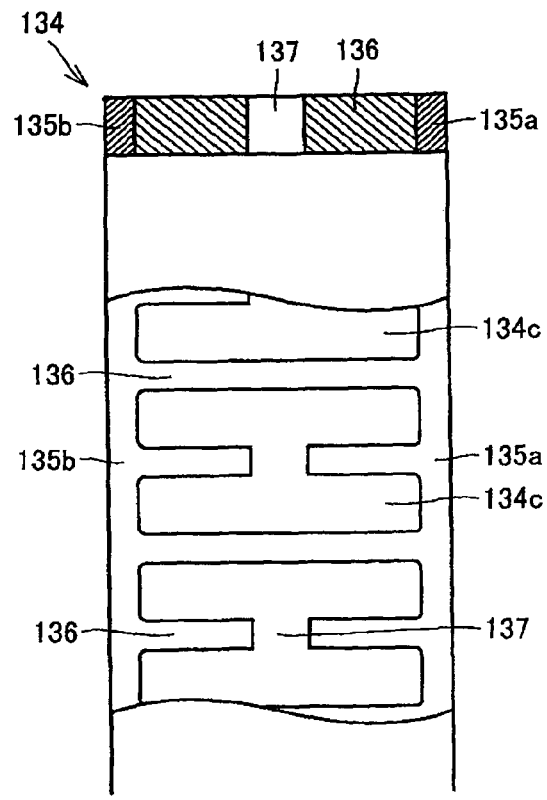
FIG. 13 is a view showing a retainer of the roller bearing taken from the radial outer side according to one embodiment of the present invention, in which an oil path penetrates in the radial direction as still another example.

Then, referring to FIG. 13, a retainer 134 has a pair of ring parts 135a and 135b, and a plurality of column parts 136 arranged between the pair of ring parts 135a and 135b, and a pocket 124c for housing a needle roller 23 is formed between the adjacent column parts 136. Thus, the column part 136 is split at the axial center, and an oil path 137 is provided at the split part so that the lubricant oil can move in the radial direction and circumferential direction.

According to the retainer 134 having the above constitution, since the oil path 137 can be large as compared with the retainer 114 shown in FIG. 11, the amount of the lubricant oil passing through the inside of the bearing can be further increased. However, since the column part 136 have to connect the right and left ring parts 135a and 135b, the oil path 137 cannot be formed in all of the column part parts 136. According to the embodiment shown in FIG. 13, the column part 136 having the oil part 137 and the column part 136 having no oil path 137 are alternately arranged.

Figure 14:
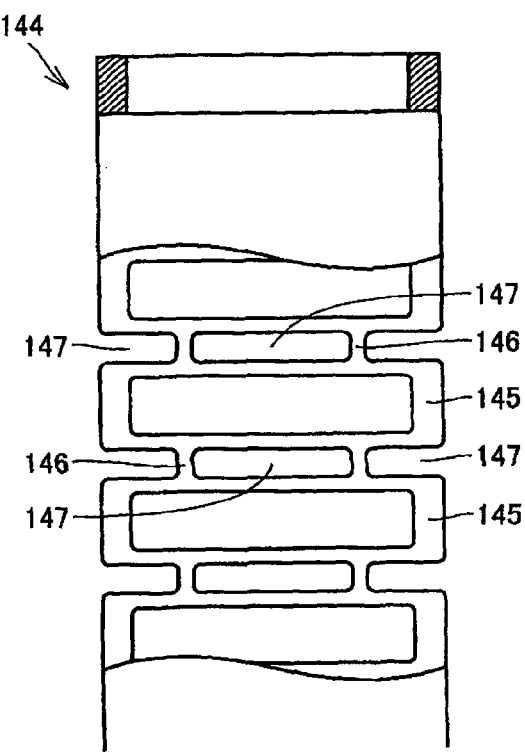
FIG. 14 is a view showing a retainer of the roller bearing taken from the radial outer side according to one embodiment of the present invention, in which an oil path penetrates in the radial direction as still another example.

Then, referring to FIG. 14, a retainer 144 has a plurality of independent pockets 145 for holding the needle rollers 23, a connection part 146 connecting the plurality of pockets in the circumferential direction, and an oil path 147 is formed between the adjacent pockets 145. The retainer 144 has only the minimum required components to hold the interval of the adjacent needle rollers 23, and it has the advantage that the degree of freedom of the position and size of the oil path 147 is very high as compared with the retainers 114 and 134 shown in FIGS. 11 and 13, respectively.

Figure 15:
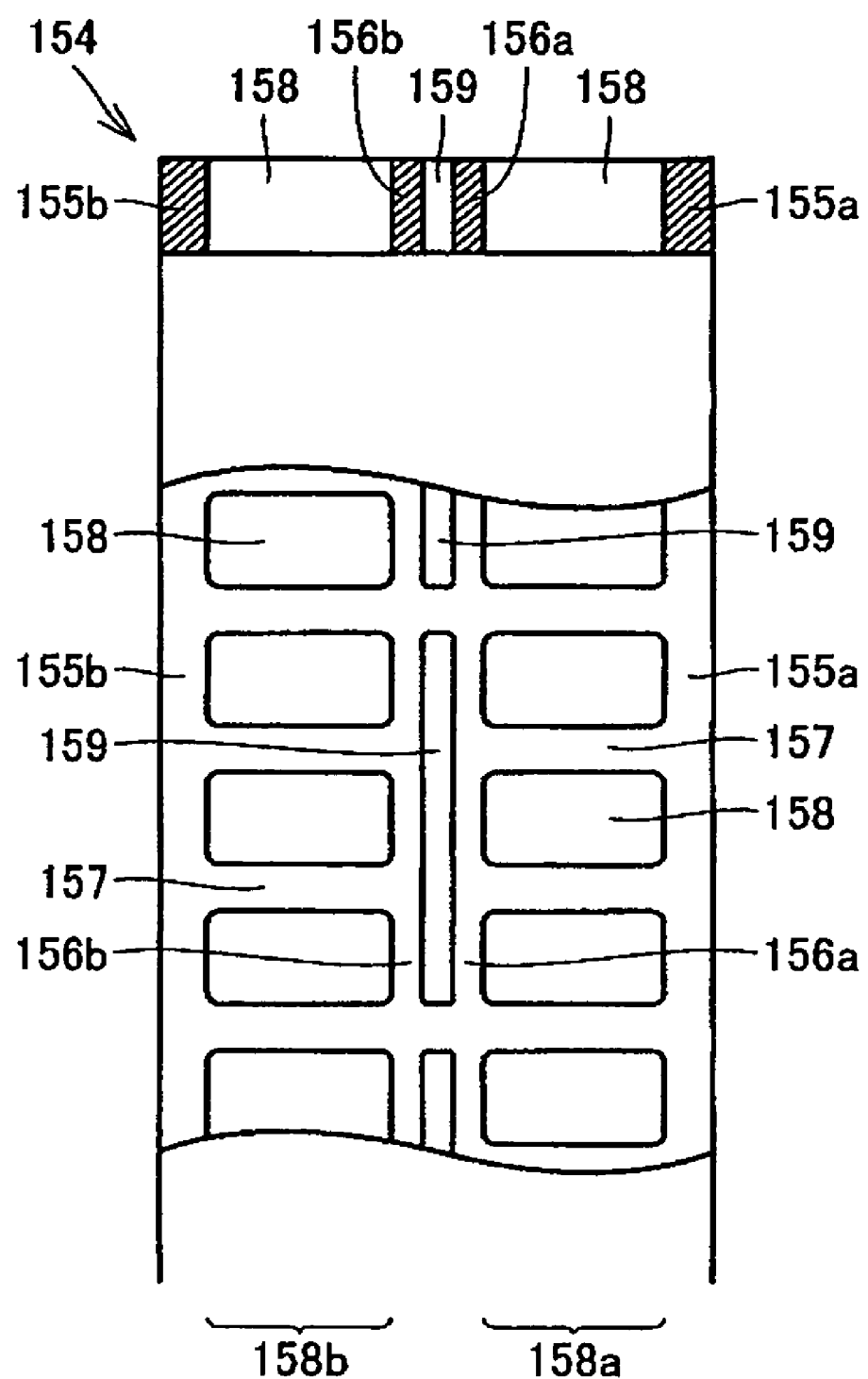
FIG. 15 is a view showing a retainer of a double-row roller bearing taken from the radial outer side according to one embodiment of the present invention, in which an oil path penetrates in the radial direction as still another example.

Then, referring to FIG. 15, a retainer 154 has a pair of first and second outer ring parts 155a and 155b at axial both ends, a pair of first and second inner ring parts 156a and 156b at the axial center, and a plurality of column parts 157 connecting the four ring parts 155a, 155b, 156a and 156b, and a plurality of pockets 158 holding the needle rollers 23 are formed in double rows in the axial direction, that is, between the first outer ring part 165a and the second inner ring part 156b (right pocket row 158a), and between the second outer ring part 155b and the second inner ring part 156b (left pocket row 158b). Thus, an oil path 159 penetrating the retainer 154 in the radial direction is formed between the two pocket rows 158a and 158b, that is, between the first and second inner ring parts 156a and 156b.

Since the amount of the lubricant oil passing through the bearing is increased in any of the configurations shown in FIGS. 11 to 15, the needle roller bearing 21 has a superior lubricating property. In addition, although the description has been made of the case where the lubricant oil flows from the oil holes 22h of the outer ring members 22a and 22b toward the oil hole 19f of the camshaft 19 in the above embodiment, the present invention is not limited to this and the lubricant oil may flow from the oil hole 19f of the camshaft 19 toward the oil holes 22h of the outer ring members 22a and 22b similarly.

In addition, the retainers 114, 124, 134, 144 and 154 shown in FIGS. 11 to 15 can be applied to various kinds of rolling bearings including the one that will be described below as another embodiment.

Although the case where the needle roller bearing 21 is employed as the bearing that supports the camshaft 19 is shown in the above embodiment, the present invention can be applied to other roller bearings such as a cylindrical roller bearing and a long roller bearing. The same is true in the following other embodiments that will be described below.

In addition, although the outer ring 22 is split to the two outer diameter members 22a and 22b in the circumferential direction in the above embodiment, it may be split into any number. For example, three outer diameter members having a center angle of 120° may be connected in the circumferential direction to form an outer ring. Furthermore, a plurality of outer diameter members having different center angles may be connected to form an annular outer ring. Similarly, the retainer 24 may have any configuration. The same is true in the following other embodiments.

In addition, although the retainer 24 is the resin retainer that is high in production efficiency and high in elastic deformability in the above embodiment, it may be a machined retainer produced through a cutting process, or a pressed retainer produced by pressing a steel plate. The same is true in the following other embodiments.

In addition, the needle roller bearing 21 according to the above embodiment is used not only as the bearing for supporting the camshaft 19 but also as the bearing for supporting the shaft part 15a of the crankshaft shown in FIG. 42 and a rocker shaft similarly. The same is true in the following other embodiments.

In addition, although the present invention can be applied to a single-cylinder internal combustion engine, it can be preferably applied to a bearing supporting a part in which the needle roller bearing 21 cannot be inserted from the axial direction such as the shaft part 15a of the crankshaft 15 employed in a multiple-cylinder engine shown in FIG. 42 and the shaft part 19b of the camshaft 19 shown in FIG. 43.

Figure 16:
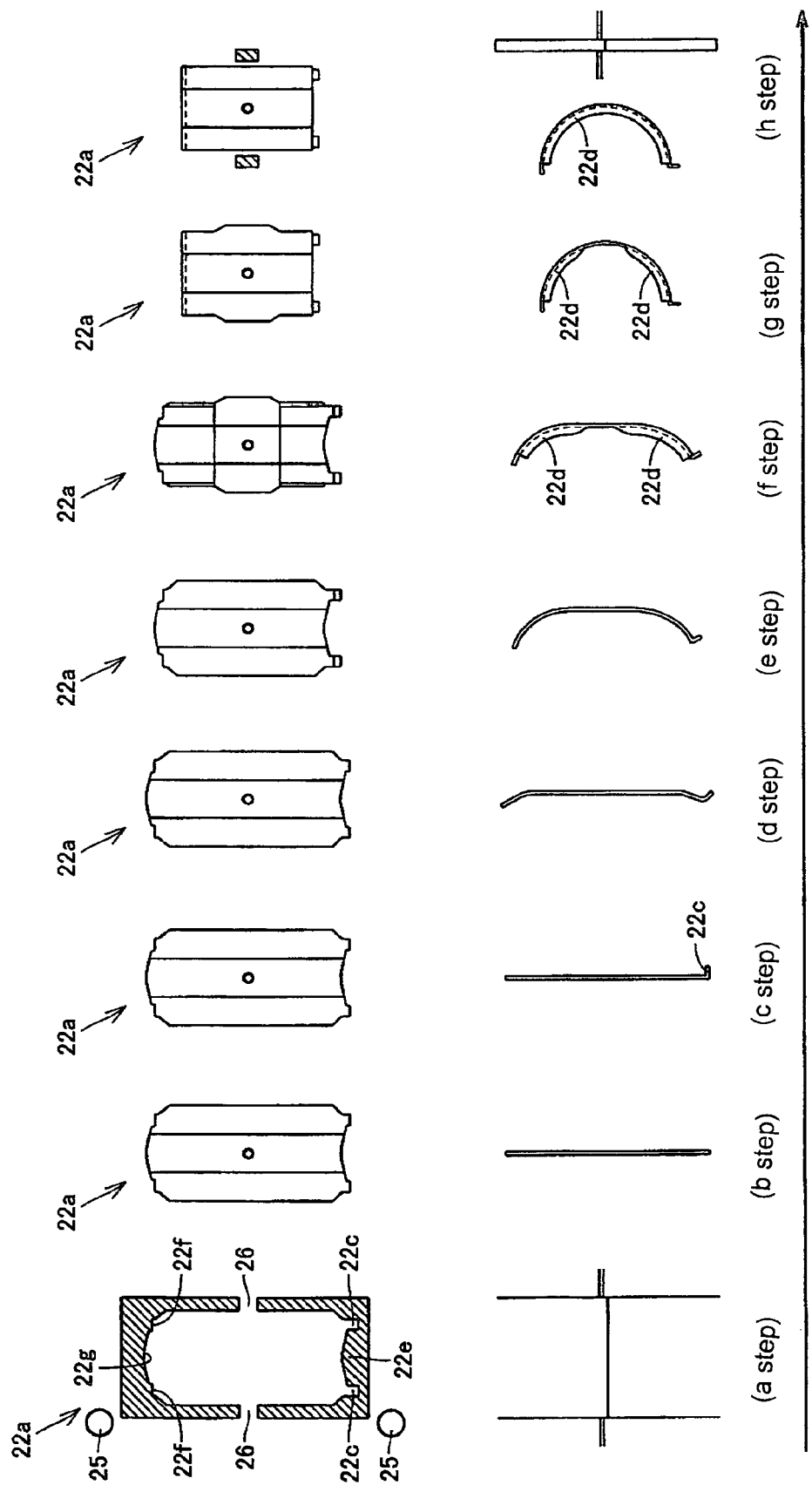
FIG. 16 is views showing a part of the production steps of the outer ring member according to one embodiment of the present invention, in which an upper part shows a plan view and a lower part shows a sectional view.

Next, the production method of the outer diameter member 22a according to one embodiment of the present invention will be described with reference to FIG. 16. FIG. 16 is views showing one part of the production steps of the outer diameter member 22a in which an upper part shows a plan view and a lower part shows a sectional view. In addition, since the production method of the outer diameter member 22b is the same as that of the outer diameter member 22a, its description will not be reiterated.

First, carbon steel containing 0.15 wt % to 1.1 wt % of carbon is used as a starting material. More specifically, SCM415 or S50C containing 0.15 wt % to 0.5 wt % of carbon, or SAE1070 or SK5 containing 0.5 wt % to 1.1 wt % of carbon may be used.

In addition, according to carbon steel containing less than 0.15 wt % of carbon, a carburized layer is not likely to be formed by a quenching process, so that it is necessary to perform a nitrocarburizing process in order to obtain hardness required for the outer diameter member 22a. The nitrocarburizing process is high in plant cost as compared with the quenching process as will be described below, and accordingly the production cost of the needle roller bearing 21 is increased. In addition, according to the carbon steel containing less than 0.15 wt % of carbon, a sufficient carburized layer is not provided even by the nitrocarburizig method in some cases, and surface origin type peeling could be generated in the track surface. Meanwhile, according to carbon steel containing more than 1.1 wt % of carbon, since processability is considerably lowered, the processing accuracy is lowered and the production cost is increased due to the increase in the number of processes.

Referring FIG. 16, as a first step, the outline of the outer diameter member 22a is formed by punching a steel plate (a step). In addition, the recession part 22e and the engagement click 22c are also formed at one side end in the longitudinal direction, and the flat part 22f and the projection part 22g are also formed on the other side end.

At this time, the longitudinal length of the outer diameter member 22a is determined based on the diameter of the camshaft 19 and the lateral length thereof is determined based on the roller length of the used needle roller 23. Here, it is to be noted that since the lateral length contains the flange part 22d, the lateral length in this step is longer than the axial width dimension of the completed outer diameter member 22a.

In this step, all parts may be punched out at one time or the predetermined configuration may be formed by repeating the punching process. In addition, when a progressive press is used, it is preferable that a pilot hole 25 is formed in order to determine the process position of each process step and a connection part 26 is provided between the adjacent outer diameter members.

As a second step, the oil groove 22i is formed in the surface that will become the outer diameter surface of the outer ring member 22a by a coining process (b step). More specifically, an outer die having a projection carved in relief having the same configuration as the oil groove 22i is pressed on the part to be the outer diameter surface of the outer ring member 22a and an inner die having a flat surface is pressed on the part to be the inner diameter surface thereof to form the oil groove 22i in the outer diameter surface while the inner diameter surface is kept flat. At this time, the oil hole 22h may be formed at a certain position of the bottom wall of the oil groove 22i by a punching process.

As a third step, the engagement click 22c is formed by bending the circumferential end of the outer diameter member 22a to the radial outer side through a bending process (c step). The bending angle of the engagement click 22c is determined by the shape of the engagement groove 13c of the housing. In addition, according to this embodiment, the engagement click 22c is bent so as to form an angle 90° with respect to the outer diameter member 22a.

A fourth step includes a step of bending the outline of the outer diameter member 22a to have the predetermined curvature through a bending process, and a step of forming the flange part 22d so as to project from axial each end of the outer diameter member 22a to the radial inner side (d step to h step). More specifically, the outline is bent from the longitudinal both ends gradually except for the center part containing the connection part 26 (d step and e step). Then, lateral both ends of the bent longitudinal both ends are bent, whereby the flange part 22d is formed (f step). Then, the longitudinal center part is bent so that the outline of the outer diameter member 22a has the predetermined curvature (g step). Finally, the connection part 26 is removed and the flange part 22d is formed at the longitudinal center part (h step).

After the above pressing process, a heat treatment is performed in order to obtain predetermined mechanical property such as hardness required for the outer diameter member 22a. In addition, the surface hardness Hv of the inner diameter surface of the outer diameter member 22a serving as the track ring needs to be 635 or more.

It is necessary to select an appropriate heat treatment based on the carbon content of the starting material so that the outer diameter member 22a can have a sufficiently deep hardened layer. More specifically, when the material contains 0.15 wt % to 0.5 wt % of carbon, a carburization quenching process is to be performed, and when the material contains 0.5 wt % to 1.1 wt % of carbon, a bright quenching or a high-frequency quenching process is to be performed.

The carburization quenching process is a heat treatment using a phenomenon in which carbon is soluble in high-temperature steel, by which a surface layer has a high carbon content (carburized layer) while the inside of the steel has a low carbon content. Thus, a high-toughness property in which the surface is hard while the inside is soft can be provided. In addition, the plant cost in this process is inexpensive as compared with that of the nitrocarburizing process.

The bright quenching process is a quenching process in which steel is heated in a protective atmosphere or vacuum to prevent a steel surface from being oxidized. In addition, its plant cost is inexpensive as compared with those of the nitrocarburizing process and carburization quenching process.

According to the high-frequency quenching process, a quenched hardened layer is formed by rapidly heating and cooling a steel surface using the principle of induction heating. The plant cost of this process is considerably low as compared with those of the other processes, and this process is environmental-friendly because gas is not used in the heat treatment process. In addition, it has the advantage that partial quenching process can be performed.

In addition, it is preferable that a tempering process is performed after the above quenching process to reduce the residual stress and internal distortion due to the quenching and to improve the toughness and stabilize the dimension.

In addition, although the step of forming the curvature of the outline of the outer diameter member 22a and the step of forming the flange part 22d are performed in parallel in this embodiment, the step of forming the curvature of the outline and the step of forming the flange part 22b may be separately performed. The same is true in the following other embodiments.

In addition, although the coining process has been employed as a method for forming the oil groove 22i in the outer diameter surface of the outer ring member 22a in the above example, the present invention is not limited to this and another cold working such as a pressing may be used. The same is true in the following other embodiments.

In addition, the first to fourth steps are only one example of the production method of the outer diameter member according to the present invention, and each step may be further divided or a necessary step may be added thereto. In addition, the order of the processes can be optionally changed. The same is true in the following other embodiments.

Furthermore, although the steps (a step to h step) may be performed individually by a single press, they may be performed by the progressive press or transfer press. Thus, the steps can be sequentially performed. In addition, when a production equipment of the outer diameter member 22a having a processing part corresponding to the all or one part of the steps (a step to h step) is used, the productivity can be enhanced and accordingly, the production cost of the needle roller bearing 21 can be lowered. The same is true in the following other embodiments.

In addition, the term "progressive press" in this specification designates a method in which the material is sequentially processed from step to step while it is moved by a feeder at a press inlet in a press containing the plurality of processing steps. In addition, the term "transfer press" in this specification designates a method in which when the plurality of process steps are required, stages required for the steps are provided and the material is moved by a transfer device and processed from stage to stage. The same is true in the following other embodiments.

Figure 17:
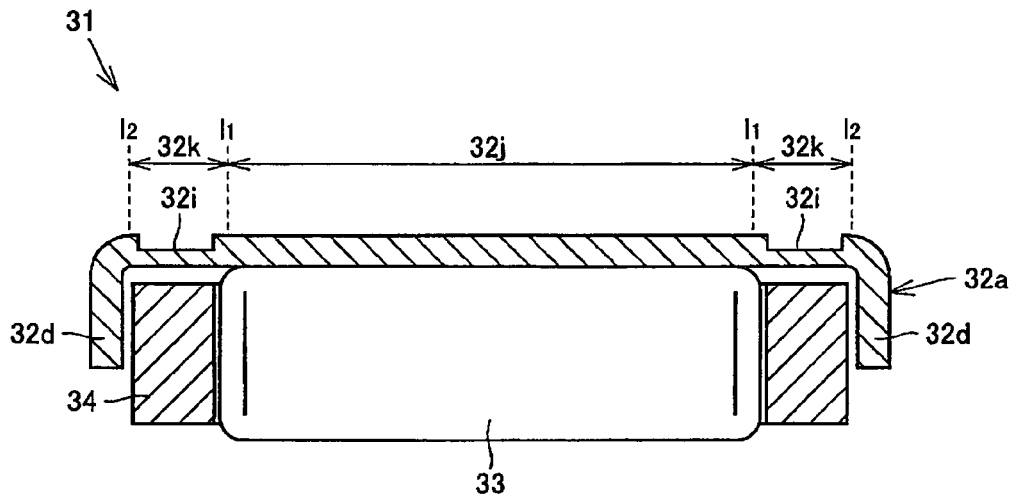
FIG. 17 is a view showing a roller bearing according to another embodiment of the one shown in FIG. 1.
Figure 18:
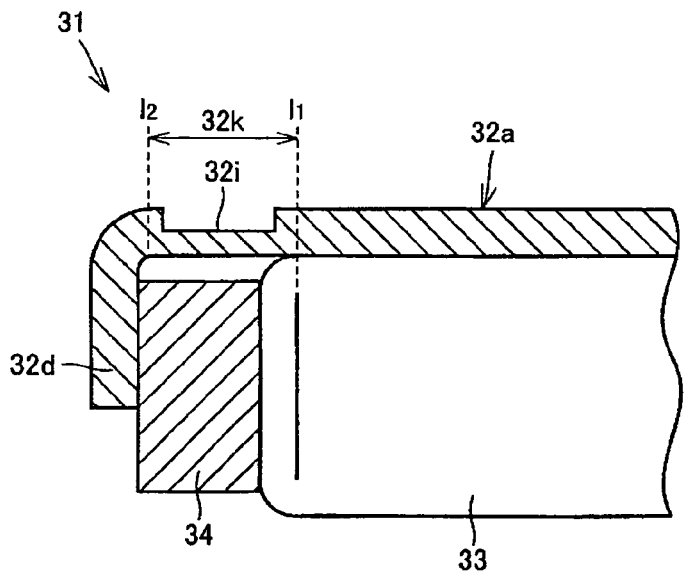
FIG. 18 is a partial enlarged view of FIG. 17.
Figure 19:
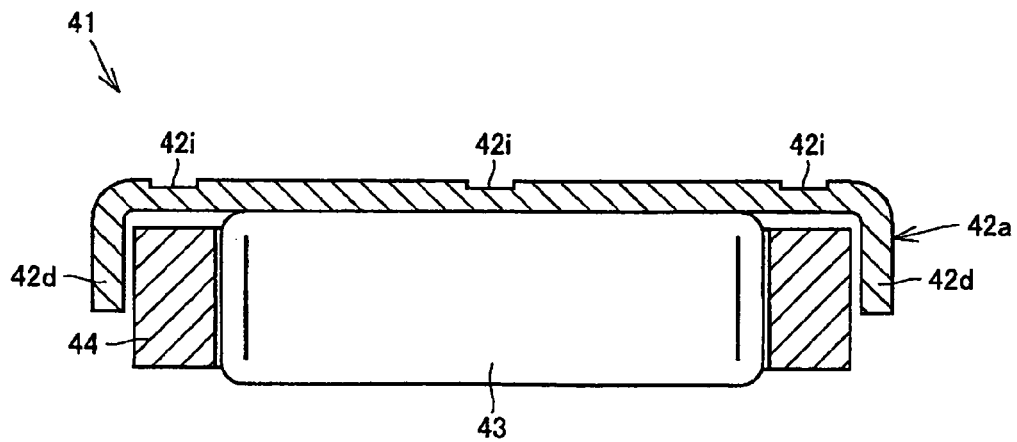
FIG. 19 is a view showing a roller bearing as another embodiment of the one shown in FIG. 1.
Figure 20:
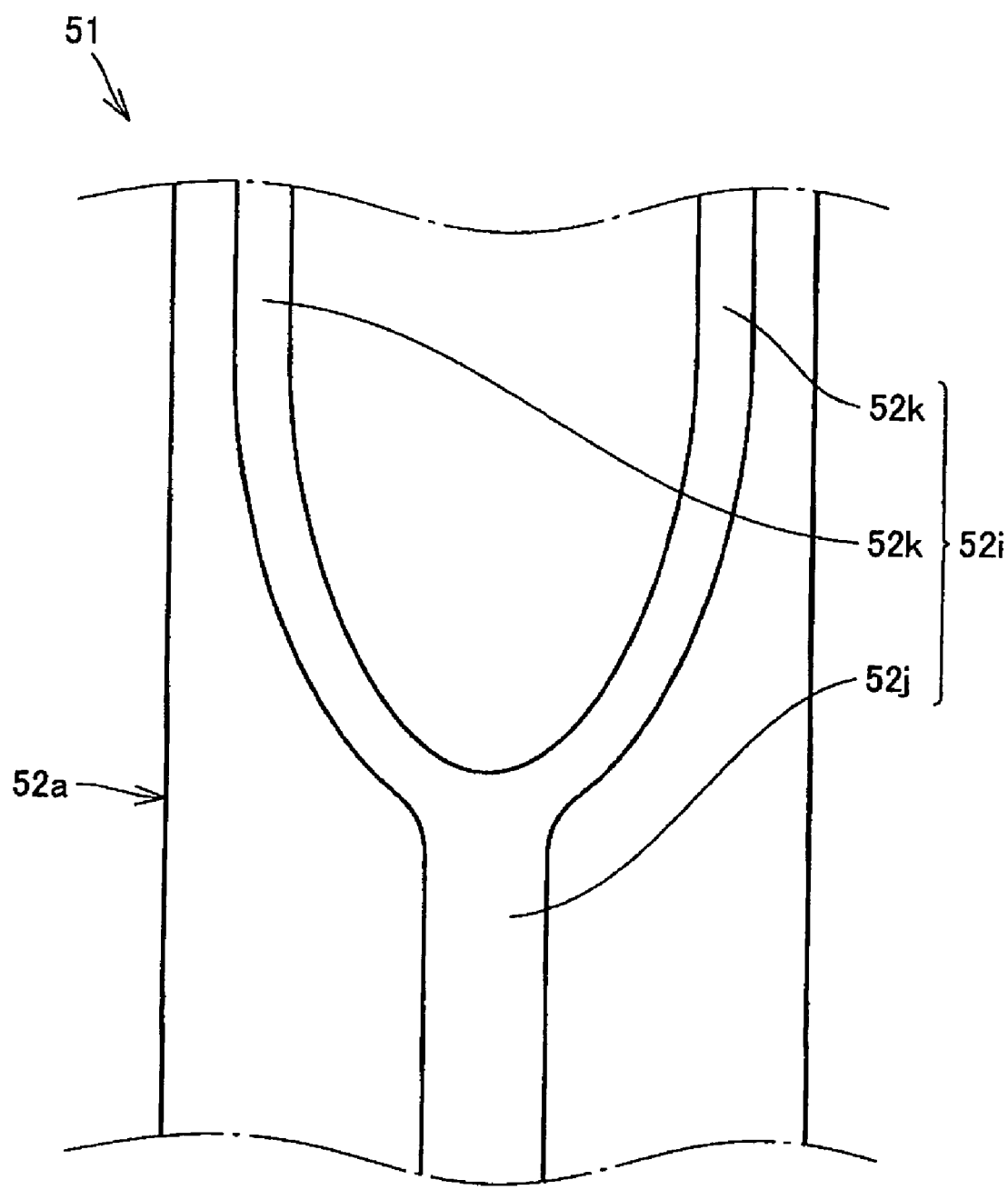
FIG. 20 is a view showing a roller bearing as still another embodiment of the one shown in FIG. 1.

Although the oil groove 22i is arranged in the center region in which a track surface being in contact with the roller 22 is formed on the inner diameter surface in the outer ring members 22a and 22b in the above embodiment, it may be arranged at any position. Next, needle roller bearings 31, 41 and 51 according to the other embodiments of the present invention will be described with reference to FIGS. 17 to 20. In addition, FIG. 17 is a sectional view showing the needle roller bearing 31, FIG. 18 is a partial enlarged view of FIG. 17, FIG. 19 is a sectional view showing the needle roller bearing 41, and FIG. 20 is an enlarged view showing an outer diameter surface of an outer ring member 52a of the needle roller bearing 51. In addition, since the base constitutions of the needle roller bearings 31, 41 and 51 are the same as the needle roller bearing 21, the description of the same part is not reiterated and different point will be mainly described.

First, referring to FIGS. 17 and 18, an outer ring member 32a employed in the needle roller bearing 31 is divided into a center region 32j (formed between broken lines $l_1$) in which a track surface being in contact with the needle roller 33 is formed on the inner diameter surface, and end regions 32k (formed between the broken line $l_1$ and a broken line $l_2$) adjacent to the center region 32j. An oil groove 32i is arranged at the end region 32k.

More specifically, as shown in FIG. 18, the oil groove 32i is desirably formed on the axial outer side of the position corresponding to the end of the rolling surface of the needle roller 33 (shown by the broken line $l_1$) when the needle roller 33 and the retainer 34 are maximally brought to axial one side, and on the axial inner side of the position corresponding to a bending start point of the inner diameter surface of the outer ring member 32 (bending base point of the flange 32d shown by the broken line $l_2$) (shown by a two-way arrow at the end regions 32k in FIG. 18).

According to the above constitution, since it is not necessary to reduce the thickness of the center region 32j in which the track surface is formed, the smooth rotation of the needle roller 33 is implemented. In this case, the oil groove may be provided on one side of the right and left end regions 32k or may be provided on both sides thereof.

Then, referring to FIG. 19, three oil grooves 42i are provided in the outer diameter surface of an outer ring member 42a employed in the needle roller bearing 41. More specifically, they are provided at the axial center and axial both ends. Thus, when the oil grooves 42i are provided at the plurality of parts, since the width and the depth of the oil groove 42i can be small, the rigidity of the outer ring member 42a can be prevented from being partially lowered.

Furthermore, referring to FIG. 20, a roughly Y-shaped oil groove 52i is provided in the outer diameter surface of the outer ring member 52a employed in the needle roller bearing 51. That is, the oil groove 52i has a first part 52j extending in the circumferential direction in the axial center and second parts 52k branched from the first part 52j to right and left directions and extending in the circumferential direction at axial both ends. Thus, the branch part between the first part 52j and the second parts 52k is inclined at a predetermined angle with respect to the rotation axis of the bearing.

When the oil groove 52i is branched as described above, the lubricant oil can be distributed to any position. In addition, the branch part between the first part 52j and the second parts 52k is inclined, since the rigidity of the outer ring member 52a can be equalized in the circumferential direction, the needle roller 53 can smoothly rotate.

In addition, the configuration of the oil groove 52i in the above embodiment is not limited to the roughly Y shape, and any configuration may be employed. In addition, according to the above embodiment, in view of the rigidity of the outer ring member 52a and the amount of the lubricant oil, the groove width of the first part 52j is designed so as to be larger than that of the second part 52k.

Figure 24:
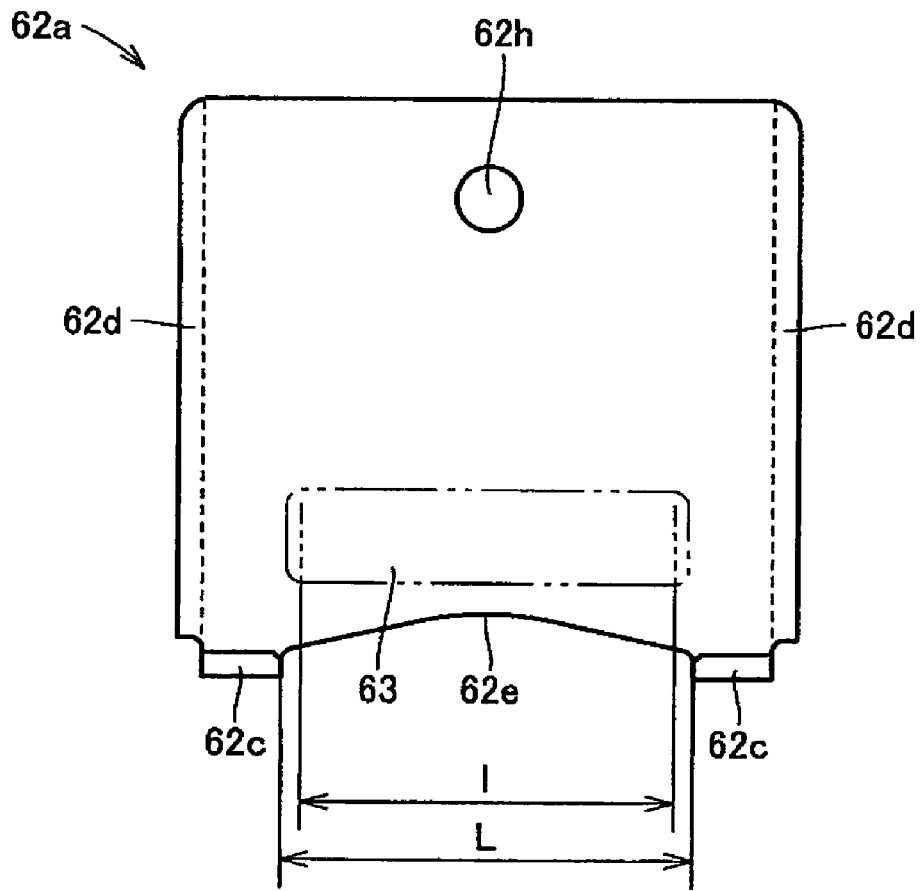
FIG. 24 is a view taken from XXIV direction in FIG. 22.
Figure 25:
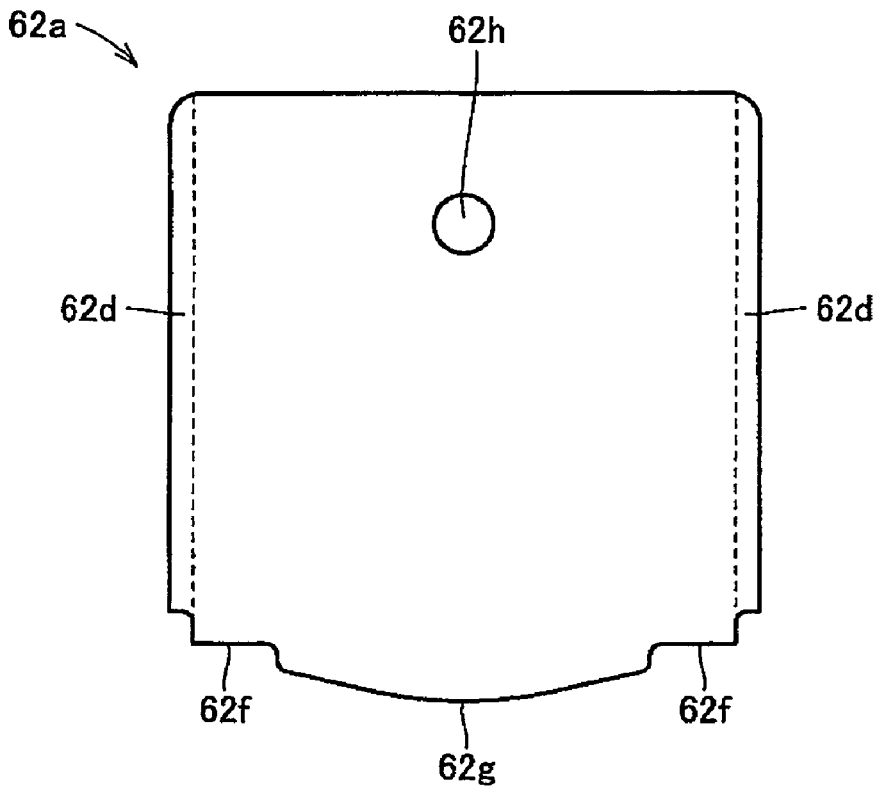
FIG. 25 is a view taken from XXV direction in FIG. 22.
Figure 26:
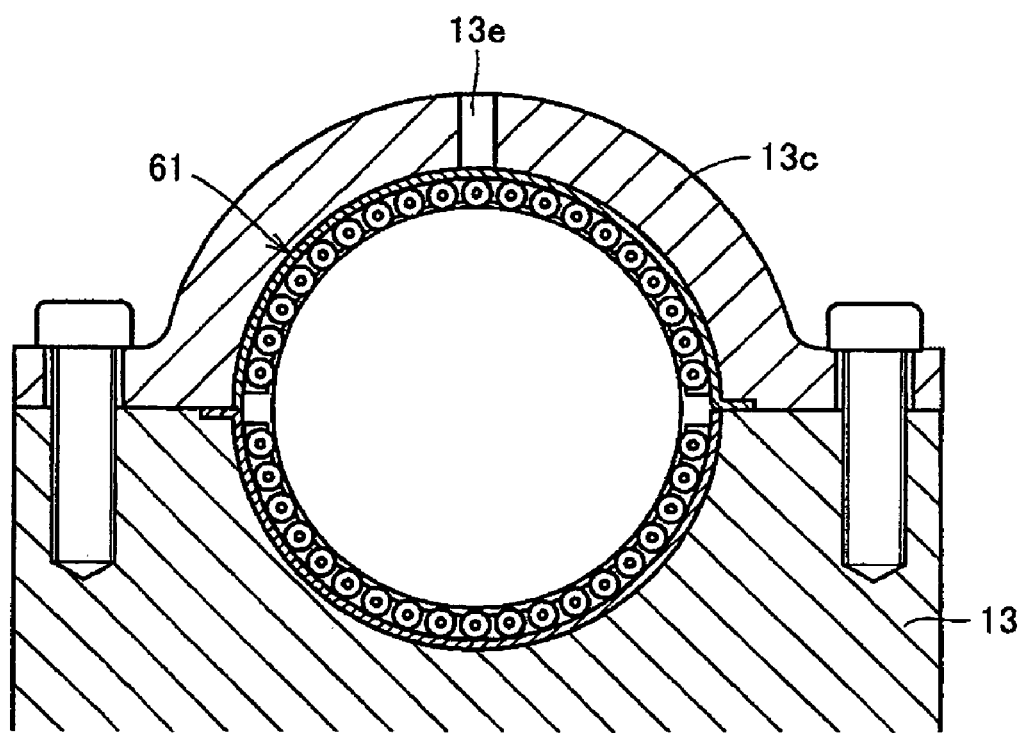
FIG. 26 is a sectional view showing a state after the incorporation of the camshaft support structure shown in FIG. 21, taken from an axial direction.
Figure 27:
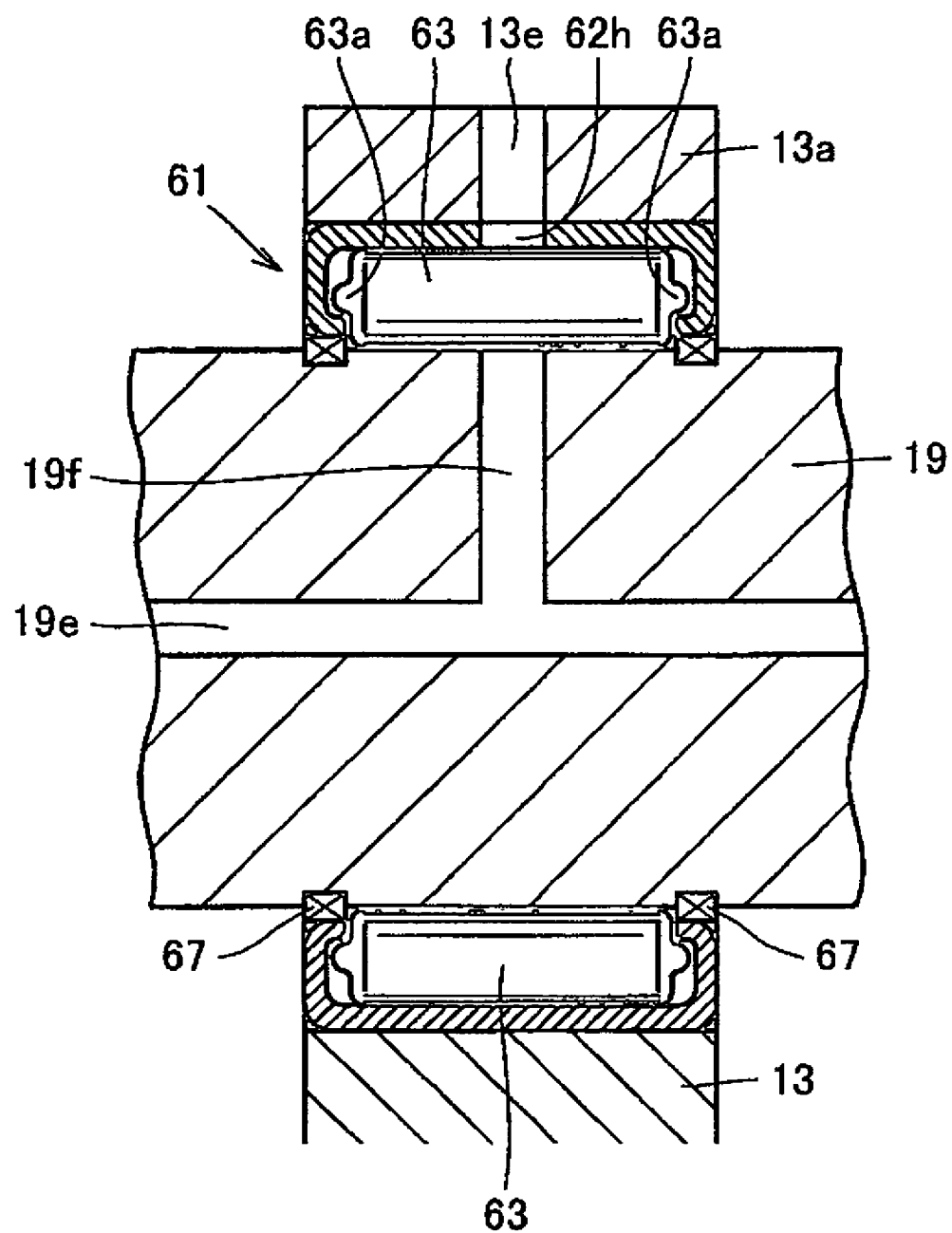
FIG. 27 is a sectional view showing the state after the incorporation of the camshaft support structure shown in FIG. 21, taken from a radial direction.

Next, a needle roller bearing 61 as a roller bearing according to another embodiment of the present invention and a camshaft support structure using the needle roller bearing 61 will be described with reference to FIGS. 21 to 27. In addition, since the base constitution of the needle roller bearing 61 is the same as the needle roller bearing 21, a description of the same part will not be reiterated and a different point will be described mainly. In addition, FIGS. 21 and 26 and 27 are views showing the state before and after the camshaft support structure is incorporated, and FIGS. 22 to 25 are views showing an outer ring member 62a.

Figure 21:
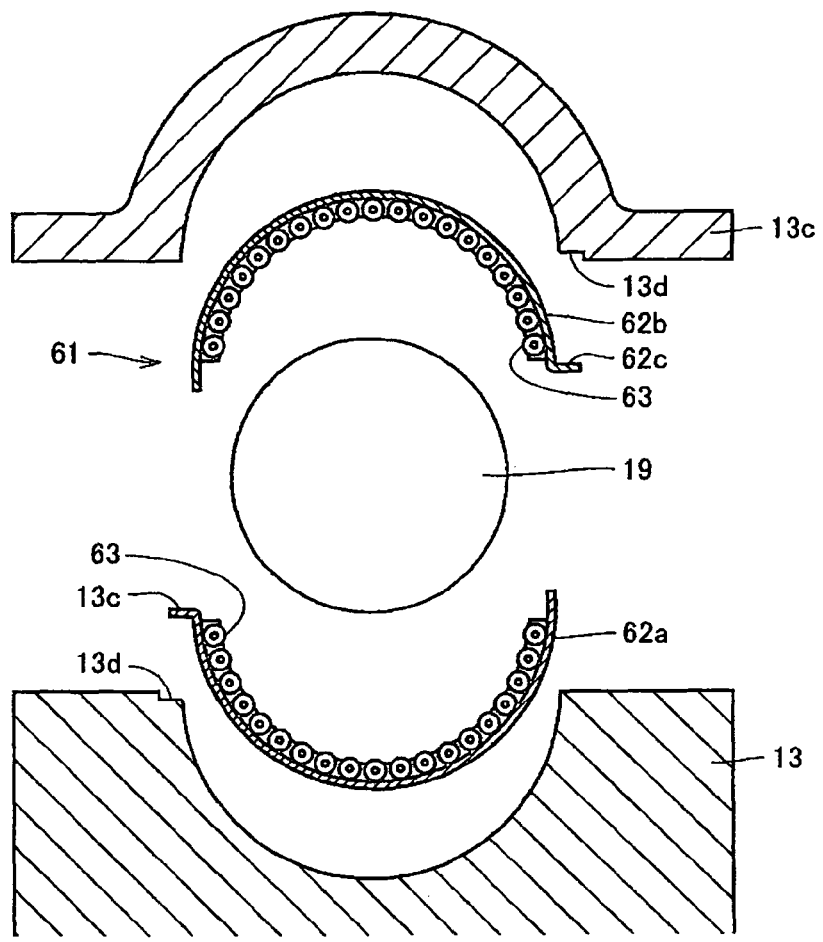
FIG. 21 is a view showing a state before the incorporation of a camshaft support structure according to another embodiment.

First, referring to FIG. 21, the camshaft support structure comprises the camshaft 19, the cylinder head 13 and the bearing cap 13c to house the camshaft 19, and the needle roller bearing 61 supporting the camshaft 19 rotatably with respect to the housing.

The needle roller bearing 61 comprises an outer ring 62 formed by connecting the arc-shaped outer ring members 62a and 62b in a circumferential direction, and a plurality of needle rollers 63 arranged along the inner diameter surface of the outer ring 62. In addition, the needle roller bearing 61 according to this embodiment is a full complement roller bearing in which adjacent needle rollers 63 are in contact with each other and a retainer retaining the needle rollers 63 is not provided.

Figure 22:
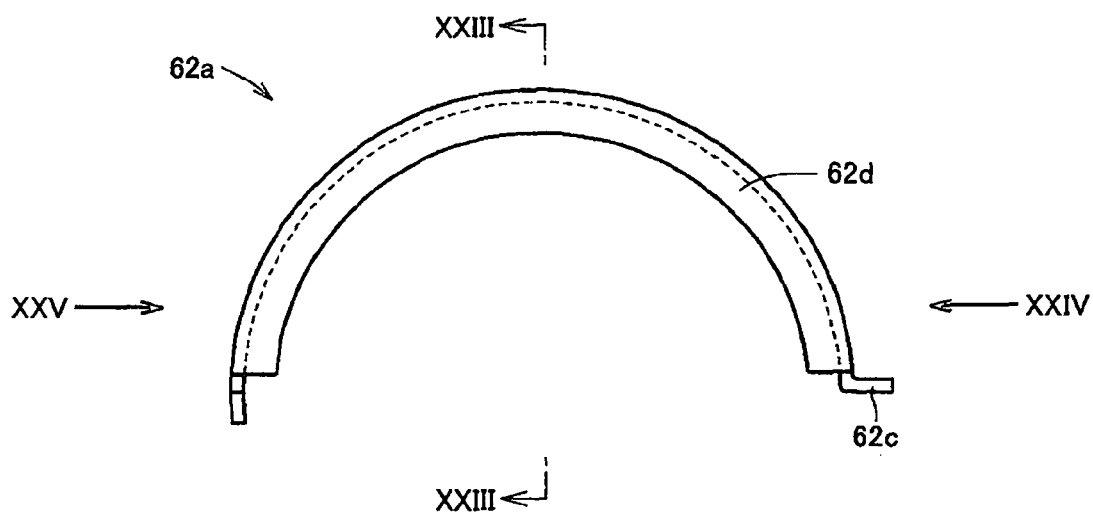
FIG. 22 is a view showing an outer ring member of a roller bearing shown in FIG. 21.
Figure 23:
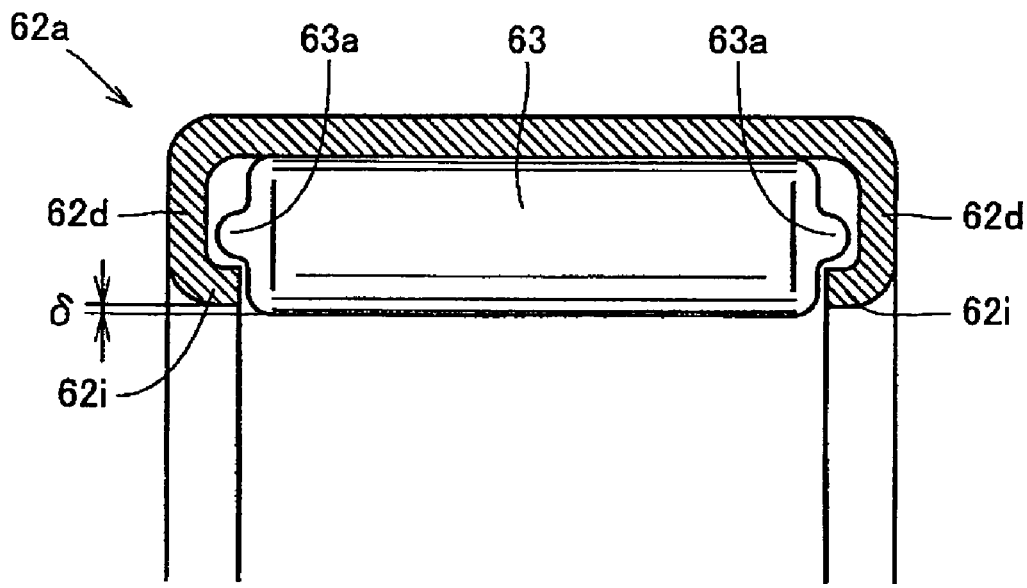
FIG. 23 is a sectional view taken along line XXIII-XXIII in FIG. 22.

The outer ring member 62a will be described with reference to FIGS. 22 to 25. In addition, FIG. 22 is a side view showing the outer ring member 62a, FIG. 23 is a view taken along XXIII-XXIII in FIG. 22, FIG. 24 is a view taken from XXIV direction in FIG. 22, and FIG. 25 is a view taken from XXV direction in FIG. 22. In addition, since the outer ring member 62b has the same configuration as the outer ring member 62a, its description will not be reiterated.

First, referring to FIG. 22, the outer ring member 62a has a semicircular configuration having a center angle of 180°, and it has an engagement click 62c bent at circumferential one side end to the radial outer side, and a flange part 62d projecting from axial each end to the radial inner side. The engagement click 62c engages with the cylinder head 13 to prevent the outer ring member 62a from rotating with respect to the housing. The flange part 62d regulates the axial movement of the retainer 24 and improves lubricant oil retention property in the bearing. Thus, the annular outer ring 62 is formed by connecting the two outer ring members 62a and 62b in the circumferential direction. In addition, the axial center of the inner diameter surface of the outer ring 62 serves as the track surface of the needle roller 63.

In addition, referring to FIG. 23, a bend part 62i is bent at the tip end of the flange part 62d on the radial inner side, toward the axial inner side at 90°. Meanwhile, projection parts 63a projecting in the longitudinal direction are provided at both end faces of the needle roller 63. The projection part 63a is arranged at a region surrounded by the inner diameter surface of the outer ring member 62a, the inner wall surface of the flange part 62d and the outer diameter surface of the bend part 62i, and rolls while being guided by the outer diameter surface of the bend part 62i. Furthermore, a gap δ between the inner diameter surface of the bend part 62i and a virtual circle being internally in contact with the plurality of needle rollers 63 is set within a range of 5 μm≦δ≦50 μm.

In addition, referring to FIG. 23, two engagement clicks 62c are provided at the axial both ends, at one circumferential side end of the outer ring member 62a, and a roughly V-shaped recession part 62e recessed in the circumferential direction is formed between the two engagement clicks 62c. In addition, the two engagement clicks 62c are arranged at axial both ends, not at the axial center serving as the track surface of the outer diameter member 62a, and are arranged on a line parallel to the rotation axis of the needle roller bearing 61. That is, a length L between the two engagement clicks 62c is set so as to be longer than an effective length l of the needle roller 63. In addition, the term "effective length of the roller" in this specification means the length of the roller with the exception of chamfered parts at both ends.

In addition, referring to FIG. 25, the other circumferential side end of the outer ring member 62a is provided with two flat parts 62f having the same width as the axial width of the engagement click 62c, at axial both ends, and a roughly V-shaped projection part 62g provided between the two flat parts 62f and having an arc-shaped tip end projecting in the circumferential direction.

In addition, the recession part 62e receives the projection part 62g of the adjacent outer ring member when the outer ring members 62a and 62b are connected in the circumferential direction. Thus, when the abutment part has the roughly V shape, the needle roller 63 can smoothly rotate. In addition, the shape of the abutment part of the outer ring members 62a and 62b is not limited to the roughly V shape, and it may be any shape as long as the needle roller 103 can smoothly rotate, such as a roughly W shape.

Furthermore, referring to FIGS. 24 and 25, the outer ring member 62a is provided with an oil hole 62h penetrating from the outer diameter side to the inner diameter side. The oil hole 62h is provided at a position opposed to an oil path (not shown) provided in the housing, through which lubricant oil is supplied to the bearing 61. In addition, the size, position and number of the oil hole 62h depend on the size, position and number of the oil path provided in the housing.

According to the needle roller bearing 61 having the above constitution, since the outer diameter surface of the bend part 62i serves as a guiding part guiding the projection part 63a of the needle roller 63, the needle roller 63 can be effectively prevented from falling and skewing. Furthermore, when the bend part 62i is provided such that the gap δ at the axial end of the needle roller bearing 61 falls within the above range, the inner diameter surface of the bend part 62i functions as a sealing surface for preventing the lubricant oil flowing outside from the inside of the bearing. As a result, the amount of the lubricant oil flowing out of the bearing inside through the gap of the axial end is reduced.

Next, referring to FIGS. 21, 26 and 27, a description will be made of the assembling process in which the needle roller bearing 61 is incorporated in the camshaft 19.

First, the needle rollers 63 are incorporated in the outer ring members 62a and 62b. More specifically, when the needle rollers 63 are inserted from the circumferential ends of the outer ring members 62a and 62b along the inner diameter surfaces, they can be easily incorporated.

Then, one outer ring member 62a, the camshaft 19, the other outer ring member 62b and bearing cap 13c are incorporated on the cylinder head 13 sequentially, and the cylinder head 13 and the bearing cap 13c are fixed by a bolt and the like. At this time, the arrangement is made such that the recession part 62e of the outer ring member 62a abuts on the projection part 62g of the outer ring member 62b, and the projection 62g of the outer ring member 62a abuts on the recession part 62e of the outer ring member 62b.

In addition, the engagement click 62c of the outer ring member 62a is arranged so as to engage with the engagement groove 13d provided in the cylinder head 13 to abut on the bearing cap 13c, and the engagement click 62c of the outer ring member 62b is arranged so as to engage with the engagement groove 13d provided in the bearing cap 13c to abut on the cylinder head 13. Thus, the outer ring members 62a and 62b can be prevented from rotating in the housing during the rotation of the bearing.

Here, the opening 13e of the oil path through which the lubricant oil is supplied to the region housing the camshaft 19 is provided in the cylinder head 13 and/or the bearing cap 13c serving as the housing. In addition, the camshaft 19 comprises the oil passage 19e extending in the axial direction and the oil hole 19f extending from the oil passage 19e to the shaft part 19a. Consequently, the needle roller bearing 61 is arranged such that the oil holed 62h formed in the outer ring members 62a and 62b coincide with the openings 13e formed in the housing.

According to the above incorporating process, the camshaft 19, the outer ring 62, and the housing are arranged concentrically, so that the needle roller 63 of the needle roller bearing 61 can stably rotate. In addition, according to the above needle roller bearing 61, since the outer ring 62 is split into the two outer ring members 62a and 62b, it can be incorporated in the support part in the radial direction, so that it can be employed as the bearing that supports the camshaft 19.

In addition, since the flange part 62d and the bend part 62i are provided in the axial each end of the outer ring members 62a and 62b, the lubricant oil in the needle roller bearing 61 can be prevented from flowing out through the axial gap. As a result, the amount of the lubricant oil supplied from the opening 13e of the housing into the oil hole 19f of the camshaft 19 through the oil holes 62h of the outer ring members 62a and 62b is increased. Thus, the camshaft support structure and the internal combustion engine have a superior lubricating property.

In addition, as a variation of the above camshaft support structure, as shown in FIG. 27, a sealing member 67 may be provided as an annular member, at a position adjacent to the inner diameter surface of the bend part 62i so as to be sandwiched between the bend part 62i and the camshaft 19. Since the sealing member 67 is inserted from the axial end of the camshaft 19, and climbs over the cam 19b to be incorporated, it is preferable that it is formed of a resin material having high elastic deformability. In addition, it is preferable that a groove to receive the sealing member 67 is provided in the surface of the camshaft 19 in order to prevent the movement of the sealing member 67.

Although high-precision processing is needed in order to satisfy 5 μm≦δ≦50 μm where δ is the gap between the inner diameter surface of the bend part 62i and the camshaft 19, when the sealing member 67 is arranged, even if the gap δ between the inner diameter surface of the bend part 62i and the camshaft 19 is such that δ>50 μm, the lubricant oil is prevented from flowing out.

Although the needle roller bearing 61 is the full complement roller bearing in which the adjacent needle rollers 63 are in contact with each other in the above embodiment, the present invention is not limited to this, and it may have a retainer retaining the interval of the adjacent needle rollers 63. Although the configuration of the retainer is not limited in particular, the retainer 24 shown in FIGS. 6 and 7 or the retainers 114, 124, 134, 144 and 155 shown in FIGS. 11 to 15 may be used, for example.

Figure 28:
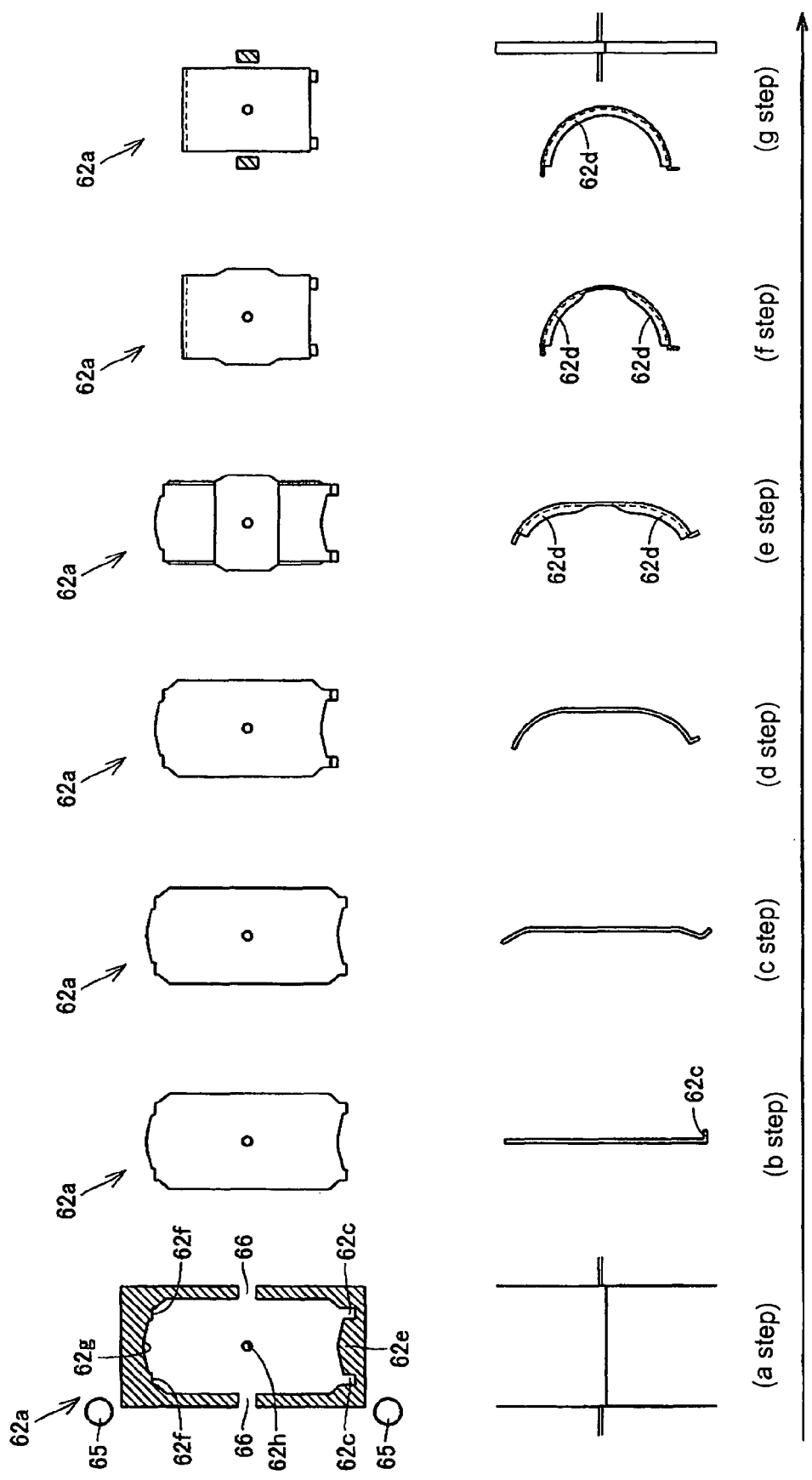
FIG. 28 is views showing a part of the production steps of the outer ring member in FIG. 22, in which an upper part shows a plan view and a lower part shows a sectional view.

Next, the production method of the outer ring member 62a shown in FIG. 22 will be described with reference to FIG. 28. In addition, FIG. 28 shows a part of the production process of the outer ring member 62a in which an upper part is a plan view and a lower part is a sectional view. In addition, the same part as the production method of the outer ring member 22a will not be described and a different point will be described mainly. More specifically, since the composition of the starting material and the heat treatment process are the same, their description will not be reiterated. Furthermore, since the production method of the outer ring member 62b is the same as that of the outer ring member 62a, its description is not reiterated.

Referring to FIG. 28, the outline of the outer ring member 62a is formed by punching out a steel plate as a first step (a step). In addition, the recession part 62e and the engagement click 62c are formed at one longitudinal side end, and the flat part 62f and the projection 62g are formed at the other longitudinal side end.

At this time, the longitudinal length of the outer ring member 62a is determined based on the diameter of the camshaft 19, and the lateral length thereof is determined based on the length of the used needle roller 63. Here, it is to be noted that since the lateral length contains the parts becoming the flange part 62d and the bend part 62i, the lateral length in this step is longer than the axial width dimension of the completed outer diameter member 62a.

In this step, all parts may be punched out at one time or the predetermined configuration may be formed by repeating the punching process. In addition, when a progressive press is used, it is preferable that a pilot hole 65 is formed in order to determine the process position of each process step and a connection part 66 is provided between the adjacent outer diameter members. In addition, the oil hole 62h may be processed at the same time when the outline is formed.

As a second step, the engagement click 62c is formed by bending the circumferential end of the outer ring member 62a to the radial outer side (b step). The bending angle of the engagement click 62c is set so as to follow the engagement groove 13c of the housing. In addition, according to this embodiment, the engagement click 62c is bent to form 90° with respect to the outer ring member 62a.

A third step includes a step of bending the outline of the outer diameter member 62a through a bending process so as to have a predetermined curvature and a step of forming the flange part 62d so as to project from axial each end of the outer ring member 62a to the radial inner side, and the bend part 62i (c step to g step). More specifically, the outline is bent from longitudinal both ends gradually except for the center part containing the connection part 66 (c step and d step). Then, lateral both ends of the bent longitudinal both ends are bent, whereby the flange part 62d is formed (e step). Then, the longitudinal center part is bent so that the outline of the outer diameter member 62a has the predetermined curvature, and the bend part 62i is formed by bending the tip end of the flange part 62d to the axial inner side (f step). Finally, the connection part 66 is removed and the flange part 62d and the bend part 62i are formed at the longitudinal center (g step).

In addition, although the step of forming the curvature of the outline of the outer diameter member 62a and the step of forming the flange part 62d and the bend part 62i are performed in parallel in this embodiment, the step of forming the curvature of the outline and the step of forming the flange part 62b and the bend part 62i may be separately performed.

Figure 30:
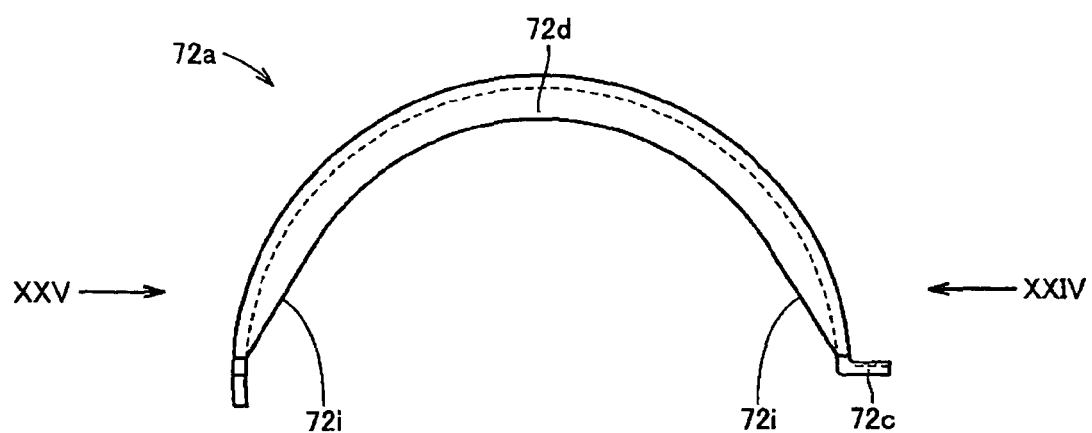
FIG. 30 is a view showing an outer ring member of a roller bearing shown in FIG. 29.
Figure 31:
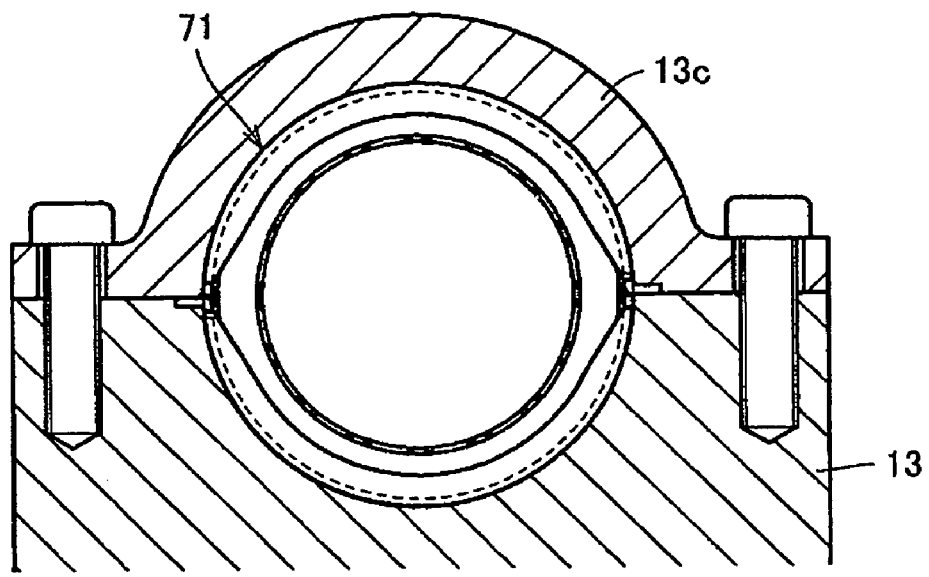
FIG. 31 is a sectional view showing a state after the incorporation of the camshaft support structure shown in FIG. 29, taken from an axial direction.
Figure 32:
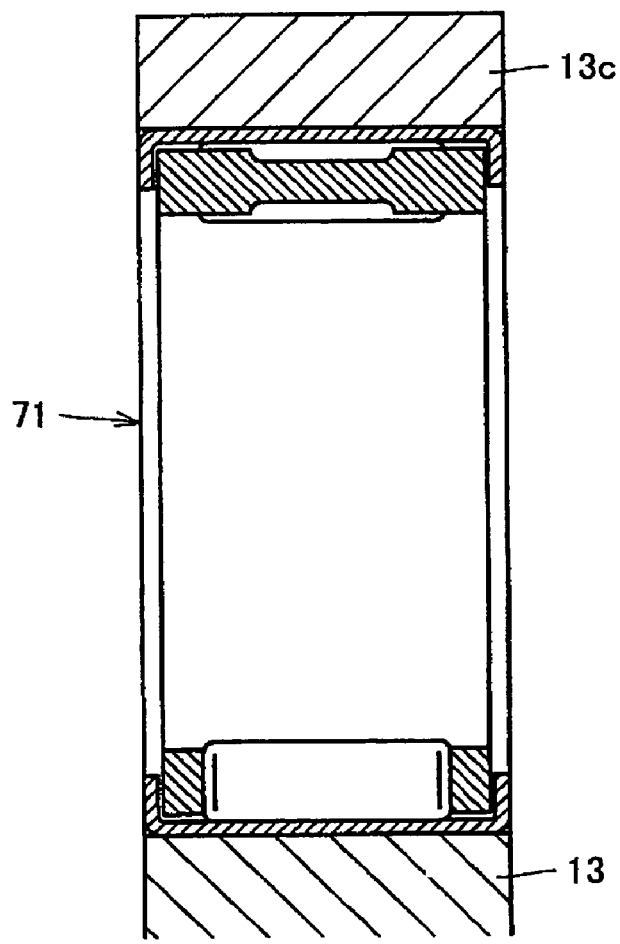
FIG. 32 is a sectional view showing the state after the incorporation of the camshaft support structure shown in FIG. 29, taken from a radial direction.

Next, a needle roller bearing 71 as a roller bearing according to another embodiment of the present invention and a camshaft support structure using the needle roller bearing 71 will be described with reference to FIGS. 29 to 32. In addition, since the base constitution of the needle roller bearing 71 is the same as the needle roller bearing 21, a description of the same part will not be reiterated and a different point will be described mainly. In addition, FIGS. 29 and 31 and 32 are views showing the state before and after the camshaft support structure is incorporated, and FIG. 30 is a view showing an outer ring member 72a.

Figure 29:
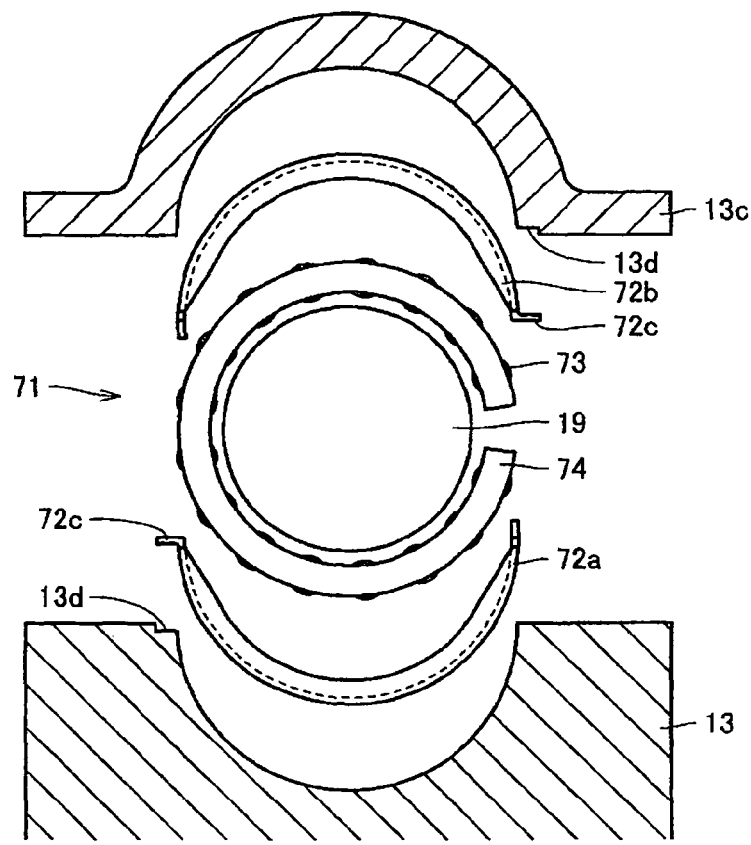
FIG. 29 is a view showing a state before the incorporation of a camshaft support structure according to another embodiment.

First, referring to FIG. 29, the camshaft support structure comprises the camshaft 19, the cylinder head 13 and the bearing cap 13c as a housing to contain the camshaft 19, and the needle roller bearing 71 supporting the camshaft 19 rotatably with respect to the housing.

The needle roller bearing 71 comprises an outer ring 72 formed by connecting the arc-shaped outer ring members 72a and 72b in a circumferential direction, a plurality of needle rollers 73 arranged along the inner diameter surface of the outer ring 72, and a retainer 74 having a split line provided at circumferential one part and extending in the axial direction of the bearing, and retaining the intervals of the plurality of needle rollers 73.

The outer ring member 72a will be described with reference to FIG. 30. In addition, FIG. 30 is a side view showing the outer ring member 72a. In addition, since a view taken from the arrow XXIV in FIG. 30, and a view taken from the arrow XXV in FIG. 30 correspond to FIGS. 24 and 25, their description will not be reiterated. In addition, since the outer ring member 72b has the same configuration as the outer ring member 72a, its description will not be reiterated.

First, referring to FIG. 30, the outer ring member 72a has a semicircular configuration having a center angle of 180°, and it has an engagement click 72c bent to the radial outer side, at its circumferential one side end and a flange part 72d projecting wholly from axial each end to the radial inner side. The engagement click 72c engages with the cylinder head 13 to prevent the outer ring member 72a from rotating with respect to the housing. The flange part 72d regulates the axial movement of the retainer 74 and improves lubricant oil retention property in the bearing. Thus, the annular outer ring 72 is formed by connecting the two outer ring members 72a and 72b in the circumferential direction. In addition, the axial center of the inner diameter surface of the outer ring 72 serves as the track surface of the needle roller 73.

In addition, the flange part 72d has a low rigid part having relatively low rigidity at the circumferential end. More specifically, the flange part is divided into a part having a constant projection height at the circumferential center of the outer ring member 72a, and inclined parts 72i having a reduced projection height gradually toward the end, at circumferential both ends thereof, and the part having the constant projection height and the inclined part 72i are smoothly connected. As a result, the projection height of the flange part 72d at the circumferential end of the outer ring member 72a (designating the inclined part 72i) is set lower than the projection height of the flange part 72d at the circumferential center thereof (thickest part).

In addition, since the constitution of the retainer 74 is the same as that of the retainer 24 shown in FIGS. 6 and 7, its description will not be reiterated.

Next, referring to FIGS. 29, 31 and 32, a description will be made of the assembling process in which the needle roller bearing 71 is incorporated in the camshaft 19.

First, the needle roller 73 is incorporated in a pocket 74c of the retainer 74. Then, the split part of the retainer 74 is enlarged and the retainer 74 is incorporated in the camshaft 19. Then, a recession part 74d engages with a projection part 74e to fix the retainer 74.

Then, one outer ring member 72a, the camshaft 19 around which the retainer 74 is wound and fixed, the other outer ring member 72b and the bearing cap 13c are incorporated on the cylinder head 13 sequentially in this order, and the cylinder head 13 and the bearing cap 13c are fixed by a bolt and the like. At this time, the arrangement is made such that the recession part 72e of the outer ring member 72a abuts on the projection part 72g of the outer ring member 72b, and the projection 72g of the outer ring member 72a abuts on the recession part 72e of the outer ring member 72b.

In addition, the engagement click 72c of the outer ring member 72a is arranged so as to engage with the engagement groove 13d provided in the cylinder head 13 to abut on the bearing cap 13c, and the engagement click 72c of the outer ring member 72b is arranged so as to engage with the engagement groove 13d provided in the bearing cap 13c to abut on the cylinder head 13. Thus, the outer ring members 72a and 72b can be prevented from rotating in the housing during the rotation of the bearing.

In addition, the curvature of the outer ring members 72a and 72b before incorporated is set so as to be slightly larger than that of the inner circumference surface of the housing. Thus, the outer ring member is incorporated in the housing while it is elastically deformed in the direction the curvature is reduced. At this time, since the outer ring members 72a and 72b try to return to their original shape (in the direction the curvature is increased), as a result, they can be incorporated along the inner circumference of the housing.

According to the above incorporating process, the camshaft 19, the outer ring 72, the retainer 74 and the housing are arranged concentrically, so that the needle roller 73 of the needle roller bearing 71 can stably rotate. In addition, according to the above needle roller bearing 71, since the outer ring 72 is split into the two outer ring members 72a and 72b, it can be incorporated in the support part in the radial direction, so that it can be employed as the bearing that supports the camshaft 19.

Here, since the curvature of the outer ring members 72a and 72b before incorporated is set so as to be larger than that of the inner circumference of the housing, the outer ring members 72a and 72b constantly try to expand outward at the circumferential ends. In addition, since the flange parts 72a are formed by bending the axial ends of the outer ring members 72a and 72b, the rigidity thereof is improved as compared with an outer ring member having no flange. As a result, it is likely that the circumferential ends of the outer ring members 72a and 72b attack the inner circumference of the housing and indentation (abrasion) is generated in the housing. When abrasion powder enters the needle roller bearing 71, the lubricant oil deteriorates in an early stage and the track surfaces of the outer ring members 72a and 72b and the rolling surface of the needle roller 73 are damaged, to considerably lower the lubricating property of the needle roller bearing 71. Thus, the projection height of the flange parts 72d at the circumferential ends of the outer ring members 72a and 72b is set relatively lower than the other parts to lower the rigidity at the circumferential ends, whereby the above problem can be avoided.

Although the inclined part 72i is provided at the circumferential end of the flange part 72d in the above embodiment, the present invention is not limited to this and for example, a step part may be provided between the flange part 72d at the circumferential center and the flange part 72d at the circumferential end such that they have different projection heights. In addition, the present invention can be applied to the one in which the projection height of the flange part 72d at the circumferential end is 0 mm, that is, the flange part 72d is not formed at the circumferential end.

In addition, according to the present invention, the projection height of the flange part 72d is lowered to some extent in order to lower the rigidity at the circumferential ends of the outer ring members 72a and 72b, which is to be distinguished from the case where the end of the flange part 72d is cut and the case where the end of the flange part 72d is chamfered to prevent the flange parts 72d of the outer ring members 72a and 72b from crossing over when the outer ring members 72a and 72b are combined adjacently.

In addition, although the rigidity lowered part is provided only at the circumferential end of the flange part 72d in the above embodiment, the rigidity lowered part may be provided at the circumferential center in addition to the circumferential end.

Figure 33:
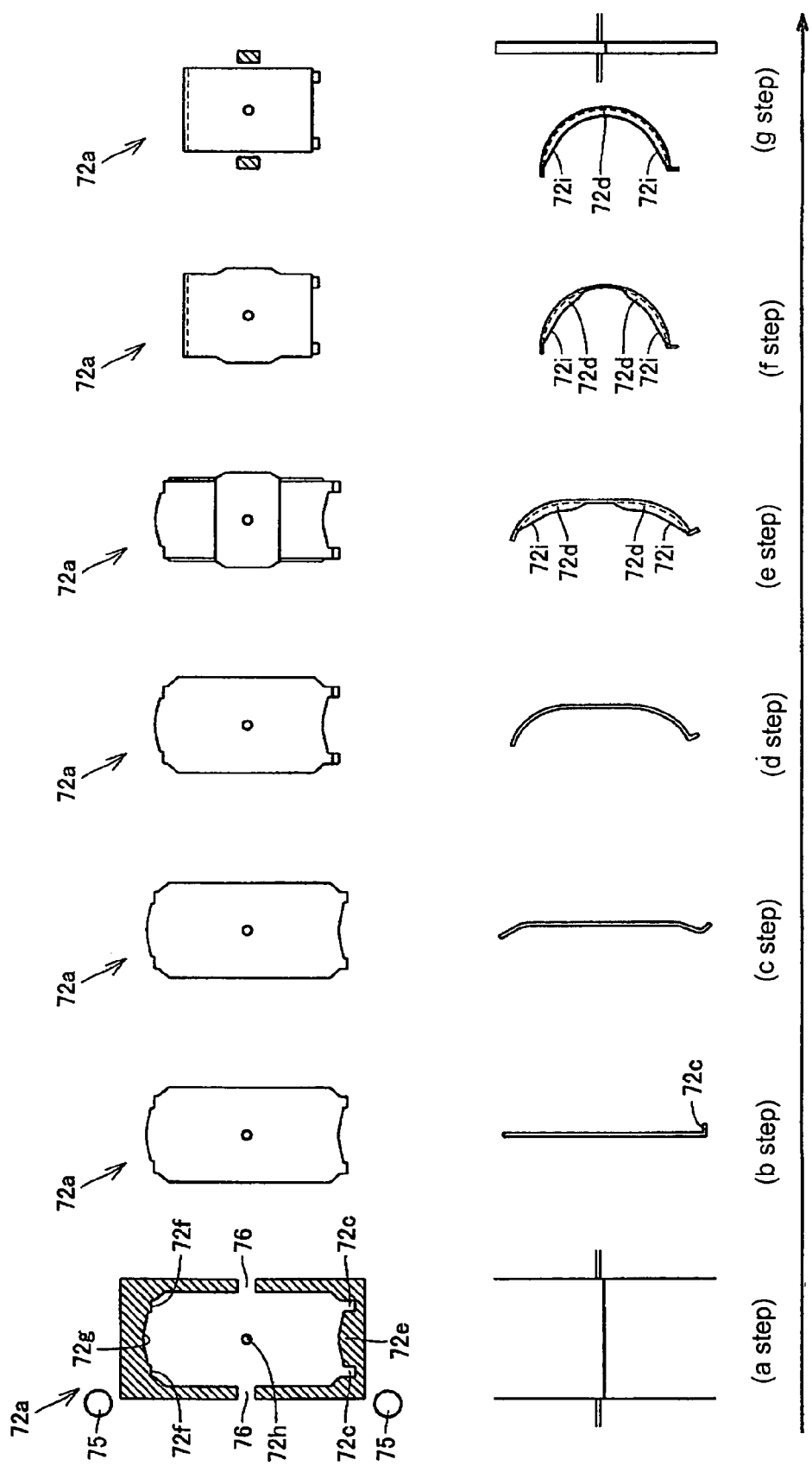
FIG. 33 is views showing a part of the production steps of the outer ring member in FIG. 30, in which an upper part shows a plan view and a lower part shows a sectional view.

Next, the production method of the outer ring member 72a shown in FIG. 30 will be described with reference to FIG. 33. In addition, FIG. 33 shows a part of the production process of the outer ring member 72a in which an upper part is a plan view and a lower part is a sectional view. In addition, the same part as the production method of the outer ring member 22a will not be described and a different point will be described mainly. More specifically, since the composition of the starting material and the heat treatment process are the same, their description will not be reiterated. Furthermore, since the production method of the outer ring member 72b is the same as that of the outer ring member 72a, its description is not reiterated.

Referring to FIG. 33, the outline of the outer ring member 72a is formed by punching out a steel plate as a first step (a step). In addition, the recession 72e and the engagement click 72c are formed at one longitudinal side end, and the flat part 72f and the projection 72g are formed at the other longitudinal side end.

At this time, the longitudinal length of the outer ring member 72a is determined based on the diameter of the camshaft 19, and the lateral length thereof is determined based on the length of the used needle roller 73. Here, it is to be noted that since the lateral length contains the parts becoming the flange part 72d, the lateral length in this step is longer than the axial width dimension of the completed outer diameter member 72a. In addition, the configuration is adjusted such that the projection height of the flange part 72d at the circumferential end is lowered than the other parts in this step.

In this step, all parts may be punched out at one time or the predetermined configuration may be formed by repeating the punching process. In addition, when a progressive press is used, it is preferable that a pilot hole 75 is formed in order to determine the process position of each process step and a connection part 76 is provided between the adjacent outer diameter members.

At a second step, the engagement click 72c is formed by bending the circumferential end of the outer ring member 72a to the radial outer side (b step). The bending angle of the engagement click 72c is set so as to follow the engagement groove 13c of the housing. In addition, according to this embodiment, the engagement click 72c is bent to form 90° with respect to the outer ring member 72a.

A third step includes a step of bending the outline of the outer diameter member 72a through a bending process so as to have a predetermined curvature, and a step of forming the flange part 72d so as to project from axial each end of the outer ring member 72a to the radial inner side, and the inclined part 72i (c step to g step). More specifically, the outline is bent from longitudinal both ends gradually except for the center part containing the connection part 76 (c step and d step). Then, lateral both ends of the bent longitudinal both ends are bent, whereby the flange part 72d is formed (e step). Then, the longitudinal center part is bent so that the outline of the outer diameter member 72a has the predetermined curvature (f step). Finally, the connection part 76 is removed and the flange part 72d is formed at the longitudinal center (g step). In addition, since the dimension of the part to be the flange part 72d is adjusted at the first step (a step), it is not necessary to provide a step for forming the inclined part 72i separately.

In addition, although the inclined part 72i having the projection height reduced gradually toward the circumferential end is provided in the flange part 72d in the above embodiment, the present invention is not limited to this and any constitution may be employed to lower the rigidity of the circumferential ends of the outer ring members 72a and 72b. For example, an outer ring member 82a according to another embodiment of the one shown in FIG. 30 will be described with reference to FIG. 34. In addition, since the base constitution of the outer ring member 82a is the same as that of the outer ring member 72a, the description of the same part will not be reiterated and a difference point will be described mainly.

Figure 34:
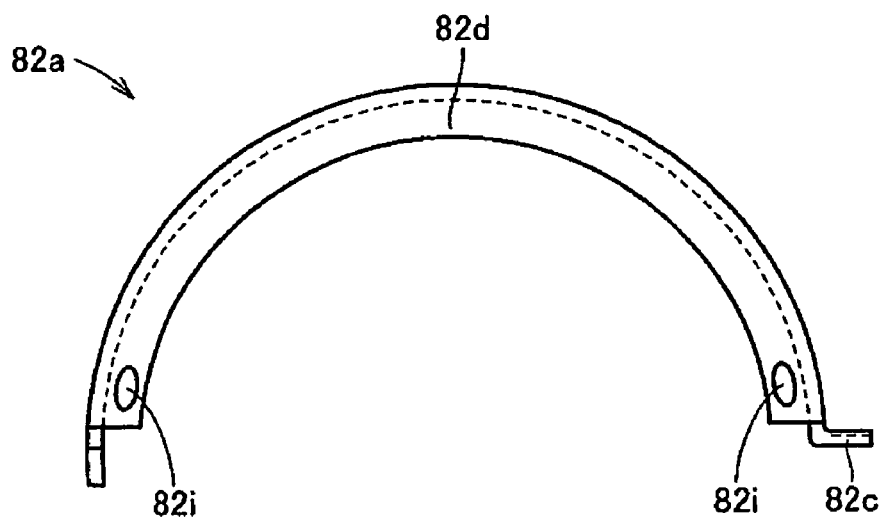
FIG. 34 is a view showing an outer ring member employed in the roller bearing according to another embodiment of the one shown in FIG. 30.

Referring to FIG. 34, the outer ring member 82a has a semicircular configuration having a center angle of 180°, and comprises an engagement click 82c bent at the circumferential one side end to the radial outer side, and a flange part 82d projecting wholly from the axial each end to the radial inner side. A hole 82i is provided at the circumferential end of the flange part 82d as a rigidity lowered part. Thus, when the hole 82i penetrating the flange part 82d in the axial direction is provided, the rigidity of the circumferential end of the flange part 82d can be also lowered.

Figure 36:
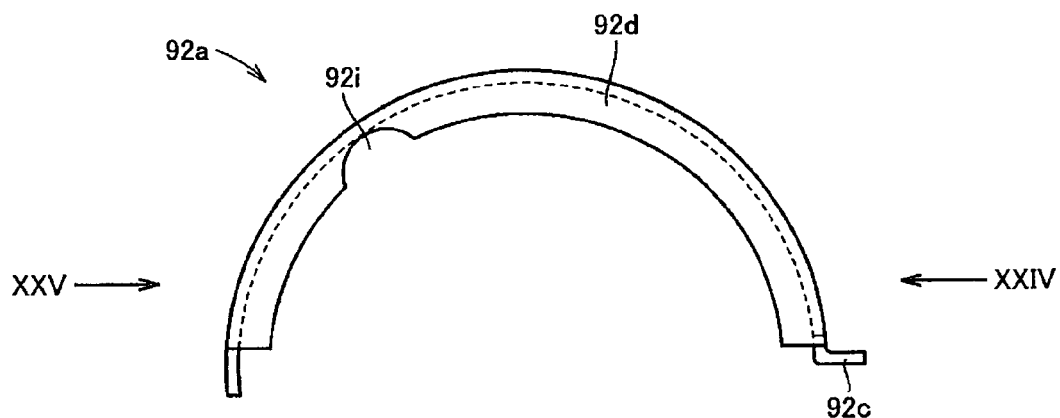
FIG. 36 is a view showing an outer ring member of a roller bearing shown in FIG. 35.
Figure 37:
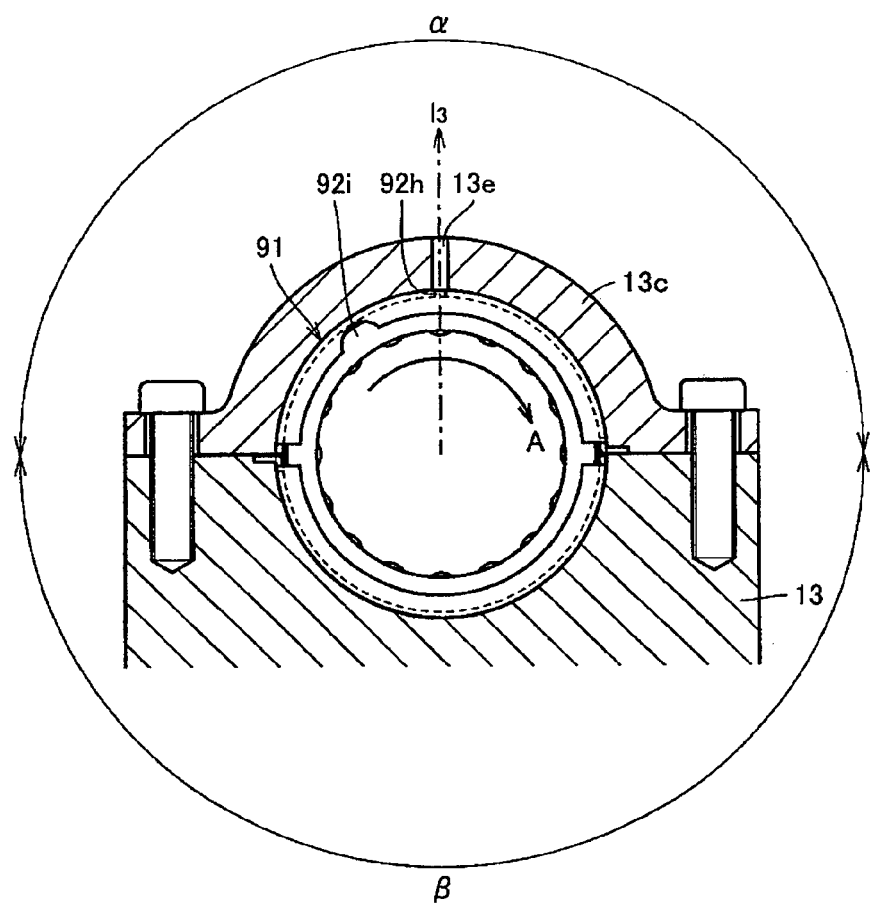
FIG. 37 is a sectional view showing a state after the incorporation of the camshaft support structure shown in FIG. 35, taken from the axial direction.
Figure 38:
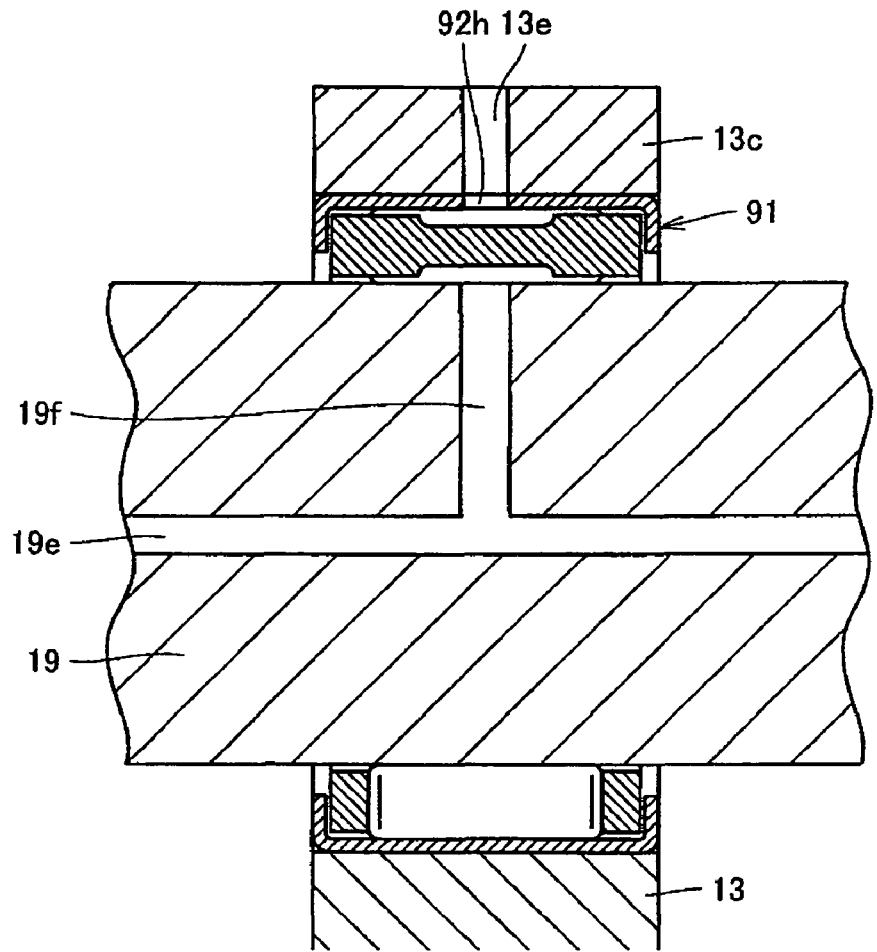
FIG. 38 is a sectional view showing the state after the incorporation of the camshaft support structure shown in FIG. 35, taken from a radial direction.

Next, a needle roller bearing 91 as a roller bearing according to another embodiment of the present invention and a camshaft support structure using the needle roller bearing 91 will be described with reference to FIGS. 35 to 38. In addition, FIGS. 35 and 37 and 38 are views showing the state before and after the camshaft support structure is incorporated, and FIG. 36 is a view showing an outer ring member 92a.

Figure 35:
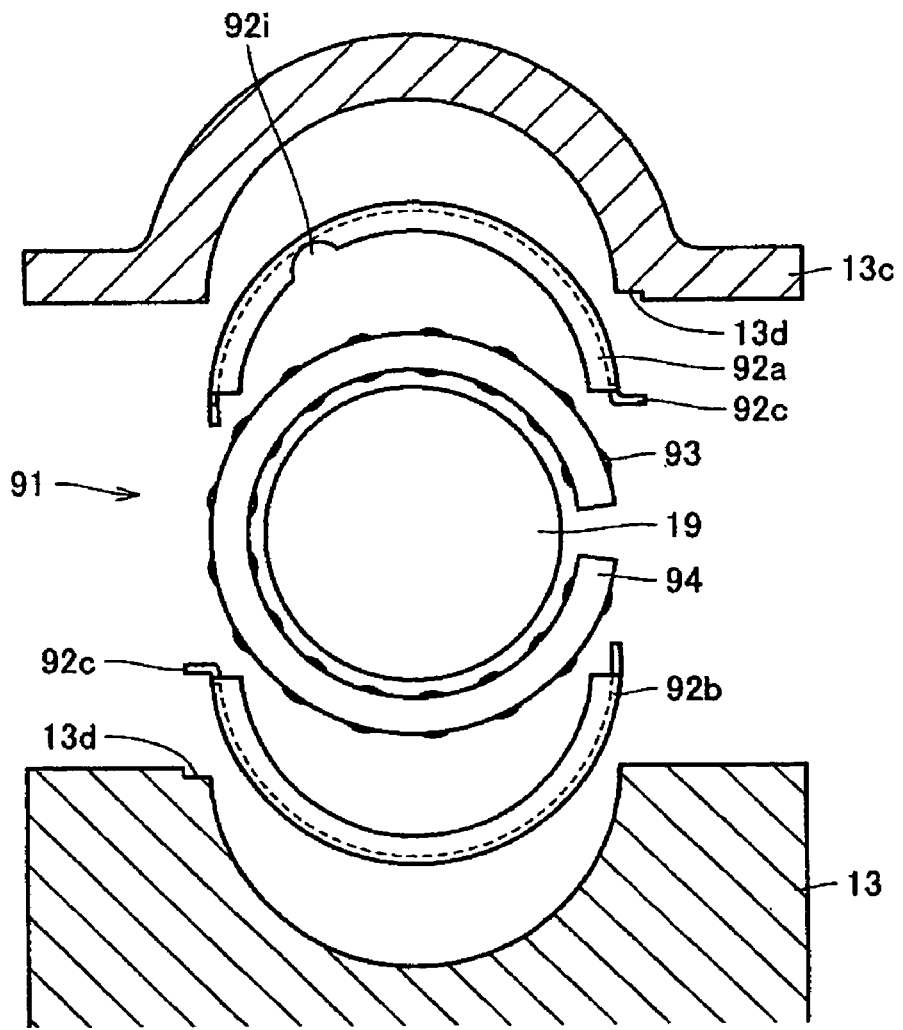
FIG. 35 is a view showing a state before the incorporation of a camshaft support structure according to another embodiment.

First, referring to FIG. 35, the camshaft support structure comprises the camshaft 19, the cylinder head 13 and the bearing cap 13c as the housing to house the camshaft 19, and the needle roller bearing 91 supporting the camshaft 19 rotatably with respect to the housing.

The needle roller bearing 91 comprises an outer ring 92 formed by connecting the arc-shaped outer ring members 92a and 92b in a circumferential direction, a plurality of needle rollers 93 arranged along the inner diameter surface of the outer ring 92, and a retainer 94 having a split line provided at circumferential one part and extending in the axial direction of the bearing, and retaining the intervals of the plurality of needle rollers 93.

The outer ring member 92a will be described with reference to FIG. 36. In addition, FIG. 36 is a side view showing the outer ring member 92a. In addition, since a view taken from the arrow XXIV in FIG. 36, and a view taken from the arrow XXV in FIG. 36 correspond to FIGS. 24 and 25, their description will not be reiterated. In addition, since the outer ring member 92b has the same configuration as the outer ring member 92a, its description will not be reiterated.

First, referring to FIG. 36, the outer ring member 92a has a semicircular configuration having a center angle of 180°, and it has an engagement click 92c bent at the circumferential one side end to the radial outer side, and a flange part 92d projecting from axial each end to the radial inner side. The engagement click 92c engages with the cylinder head 13 to prevent the outer ring member 92a from rotating with respect to the housing. The flange part 92d regulates the axial movement of the retainer 94 and improves a lubricant oil retention property in the bearing. In addition, a notched part 92i is provided at one part of the flange part 92d as an opening penetrating in the axial direction. In addition, this notched part 92i is in the form of an arc shape having a predetermined curvature.

Thus, the annular outer ring 92 is formed by connecting the two outer ring members 92a and 92b in the circumferential direction. In addition, the axial center of the inner diameter surface of the outer ring 92 serves as the track surface of the needle roller 93.

When the flange part 92d is provided as described above, the axial movement of the retainer 94 can be regulated and the gap between the axial ends is reduced, whereby the lubricant oil retaining property of the needle roller bearing 91 is improved. In addition, when the notched part 92i is provided at one part of the flange part 92d, the lubricant oil in the bearing flows out through this notched part 92i mainly. Therefore, when the notched part 92i is arranged at the load region of the camshaft 19, the lubricant oil can be intensively supplied to the load region.

Since the constitution of the retainer 94 is the same as that of the retainer 24 shown in FIGS. 6 and 7, its description will not be reiterated.

Next, referring to FIGS. 35, 37 and 38, a description will be made of the assembling process in which the needle roller bearing 91 is incorporated in the camshaft 19.

First, the needle roller 93 is incorporated in a pocket 94c of the retainer 94. Then, the split part of the retainer 94 is enlarged and the retainer 94 is incorporated in the camshaft 19. Then, a recession part 94d engages with a projection part 94e to fix the retainer 94.

Then, one outer ring member 92b, the camshaft 19 around which the retainer 94 is wound and fixed, the other outer ring member 92a and the bearing cap 13c are incorporated on the cylinder head 13 sequentially in this order, and the cylinder head 13 and the bearing cap 13c are fixed by a bolt and the like. At this time, the arrangement is made such that the recession part 92e of the outer ring member 92a abuts on the projection part 92g of the outer ring member 92b, and the projection 92g of the outer ring member 92a abuts on the recession part 92e of the outer ring member 92b.

In addition, the engagement click 92c of the outer ring member 92a is arranged so as to engage with the engagement groove 13d provided in the cylinder head 13 to abut on the bearing cap 13c, and the engagement click 92c of the outer ring member 92b is arranged so as to engage with the engagement groove 13d provided in the bearing cap 13c to abut on the cylinder head 13. Thus, the outer ring members 92a and 92b can be prevented from rotating in the housing during the rotation of the bearing.

Here, an opening 13e of an oil path through which the lubricant oil is supplied to the region in which the camshaft 19 is contained is provided in each of the cylinder head 13 and the bearing cap 13c serving as the housing. In addition, the oil passage 19e extending in the axial direction and the oil hole 19f extending from the oil passage 19e to the shaft part 19a are formed in the camshaft 19. Thus, when the needle roller bearing 91 is incorporated, the arrangement is made such that the oil holes 92h of the outer ring members 92a and 92b are aligned with the openings 13e of the housing. In addition, the notched part 92i formed in the flange part 92d is arranged so as to be positioned in the load region of the camshaft 19.

According to the above incorporating process, the camshaft 19, the outer ring 92, the retainer 94 and the housing are arranged concentrically, so that the needle roller 93 of the needle roller bearing 91 can stably rotate. In addition, according to the above needle roller bearing 91, since the outer ring 92 is split into the two outer ring members 92a and 92b, it can be incorporated in the support part in the radial direction, so that it can be employed as the bearing that supports the camshaft 19.

In addition, since the notched parts 92i are provided in the flange parts 92d of the outer ring members 92a and 92b, the lubricant oil in the bearing is mostly flows out through the notched parts 92i. Thus, when the notched part 92i is arranged in the load region, the lubricant oil can be intensively supplied to the load region. As a result, the camshaft support structure and the internal combustion engine 11 have a superior lubricating property and high reliability.

Here, it is to be noted that the notched part 92i is arranged at a position away from a phantom line $l_3$ extending in the direction of the maximum load applied from the camshaft 19 to the needle roller bearing 91. More specifically, the notched part 92i is to be arranged at a position out of the circumferential center of outer ring member 92a. Meanwhile, the outer ring member 92a is incorporated such that the phantom line $l_3$ passes through the circumferential center of the outer ring member 92a. Since the rigidity of the needle roller bearing 91 is lowered at the region comprising the notched part 92i to some extent, when the notched part 92i is provided away from the maximum load point (point at the intersection of the phantom line $l_3$ with the outer ring member 92a), the effect due to the lowering of the rigidity can be reduced.

Furthermore, it is desirable that the notched part 92i is provided on the opposite side of the rotation direction (direction shown by an arrow A in FIG. 37) of the camshaft 19 based on the phantom line $l_3$. As a result, since the lubricant oil is supplied from the inner side and outer side of the needle roller bearing 91 to the maximum load point, the cooling effect can be improved at the maximum load point.

In addition, the term "load region" designates a region at 90° to right and left directions (region at 180° shown by an arc α in FIG. 37) across the maximum load direction applied from the camshaft 19 to the needle roller bearing 91 (direction shown by the phantom line $l_3$ in FIG. 37). Meanwhile, the term "non-load region" designates a region at 180° (region shown by an arc β in FIG. 37) on the opposite side of the maximum load direction, in which only a relatively small load is applied as compared with the load region (including the case where the load is zero).

In addition, in the internal combustion engine 11 shown in FIG. 41, the maximum load applied from the camshaft 19 to the needle roller bearing 91 is a reaction of the force pressing down the valves 17 and 18 against the valve springs 17c and 18c, and its direction is opposite to the direction in which the camshaft 19 presses the valves 17 and 18 (direction shown by an arrow in FIG. 41).

In addition, although the arc-shaped notched part 92i is provided at one position in the above embodiment, the present invention is not limited to this, and its configuration, number and position may be optionally set. For example, it may have any configuration such as a rectangle, and it may be provided at the circumferential center. However, since it is desirable that the abutment part between the adjacent outer ring members 92a and 92b is positioned in the non-load region, it is desirable that the maximum load point is positioned at the circumferential center of the outer ring member 92a as shown in FIG. 36. Furthermore, it may be provided in one flange part 92d or may be provided in both flange parts 92d.

In addition, although the notched part 92i is provided as the opening penetrating in the axial direction in the above embodiment, the present invention is not limited to this and it may have any configuration. Furthermore, the opening may be provided at any position of the flange part. For example, an outer ring member 102 according to another embodiment of the one shown in FIG. 36 will be described with reference to FIG. 39. Since its base constitution is the same as the outer ring member 92a shown in FIG. 36, the same part will not be described and a different point will be described mainly.

Figure 39:
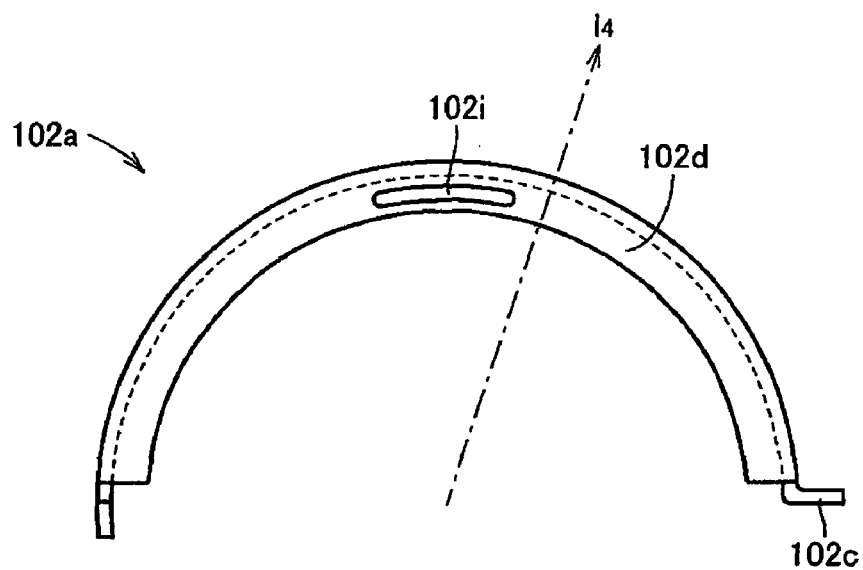
FIG. 39 is a view showing an outer ring member of the roller bearing according to another embodiment of the one shown in FIG. 36.

Referring to FIG. 39, the outer ring member 102a is in the form of an arc shape, and has an engagement click 102c on circumferential one side end, a flange part 102d at axial each end, and a hole 102i as an opening at the circumferential center of the flange part 102d. In addition, according to this embodiment, the hole 102i is an elongate hole following the curvature of the flange part 102d.

Thus, since the opening is provided as the hole 102i, the projection height of the flange part 102d is constant in the circumferential direction. Thus, the function of the retainer 94 for the axial movement is improved. In addition, the hole 102i may be such that a plurality of small-diameter holes are provided. In addition, the outer ring member 102a is to be inclined so that a phantom line $l_4$ extending in a maximum load direction passes through the part away from the hole 102*i* when it is incorporated in the camshaft 19.

Figure 40:
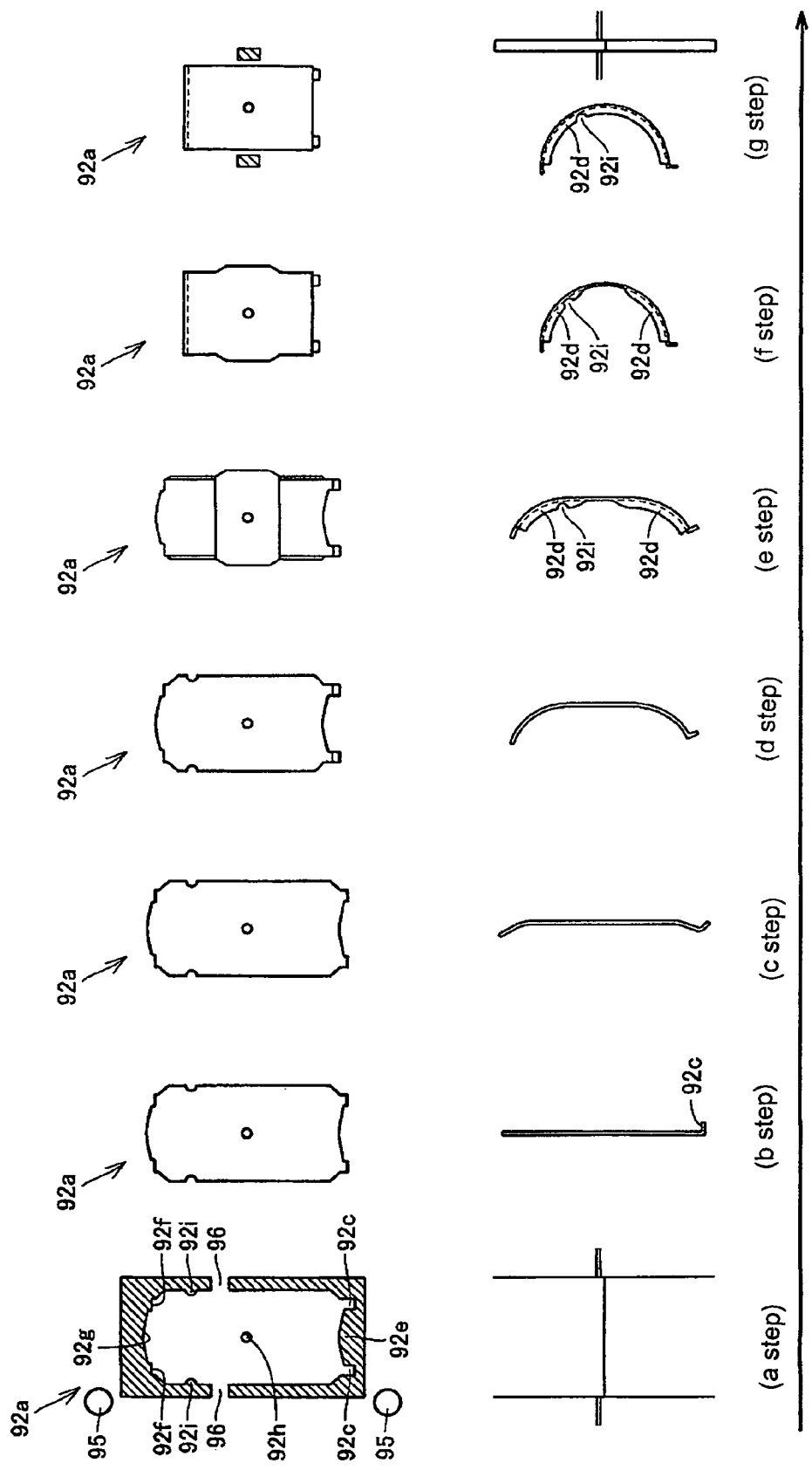
FIG. 40 is views showing a part of production steps of the outer ring member in FIG. 36, in which an upper part shows a plan view and a lower part shows a sectional view.

Next, the production method of the outer ring member 92*a* shown in FIG. 36 will be described with reference to FIG. 40. In addition, FIG. 40 shows a part of the production process of the outer ring member 92*a* in which an upper part is a plan view and a lower part is a sectional view. In addition, the same part as the production method of the outer ring member 22*a* will not be described and a different point will be described mainly. More specifically, since the composition of the starting material and the heat treatment process are the same, their description will not be reiterated. Furthermore, since the production method of the outer ring member 92*b* is the same as that of the outer ring member 92*a*, its description is not reiterated and a different point will be described mainly.

Referring to FIG. 40, the outline of the outer ring member 92*a* is formed by punching out a steel plate as a first step (a step). In addition, the recession part 92*e* and the engagement click 92*c* are formed at one longitudinal side end, and the flat part 92*f* and the projection part 92*g* are formed at the other longitudinal side end. Furthermore, the notched part 92*i* is formed at the center of the lateral each end.

At this time, the longitudinal length of the outer ring member 92*a* is determined based on the diameter of the camshaft 19, and the lateral length thereof is determined based on the length of the used needle roller 93. Here, it is to be noted that since the lateral length contains the parts becoming the flange part 92*d*, the lateral length in this step is longer than the axial width dimension of the completed outer diameter member 92*a*.

In this step, all parts may be punched out at one time or the predetermined configuration may be formed by repeating the punching process. In addition, when a progressive press is used, it is preferable that a pilot hole 95 is formed in order to determine the process position of each process step and a connection part 96 is provided between the adjacent outer diameter members. In addition, the connection part 96 is provided at a position away from the position in which the notched part 92*i* is formed.

As a second step, the engagement click 92*c* is formed by bending the circumferential end of the outer ring member 72*a* to the radial outer side (b step). The bending angle of the engagement click 92*c* is set so as to follow the engagement groove 13*c* of the housing. In addition, according to this embodiment, the engagement click 92*c* is bent to form 90° with respect to the outer ring member 92*a*.

A third step includes a step of bending the outline of the outer diameter member 92*a* through a bending process so as to have a predetermined curvature, and a step of forming the flange part 92*d* so as to project from axial each end to the radial inner side of the outer ring member 92*a* (c step to g step). More specifically, the outline is bent from longitudinal both ends gradually except for the center part containing the connection part 96 (c step and d step). Then, lateral both ends of the bent longitudinal both ends are bent, whereby the flange part 92*d* is formed (e step). Then, the longitudinal center part is bent so that the outline of the outer diameter member 92*a* has the predetermined curvature (f step). Finally, the connection part 76 is removed and the flange part 92*d* is formed at the longitudinal center (g step).

The above embodiments can be combined optionally, whereby a synergetic effect can be expected due to the combination.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to the roller bearing, the camshaft support structure and the internal combustion engine in which the camshaft of the engine for a car and a two-wheeled motor vehicle is supported.

The invention claimed is:
1. A roller bearing comprising:
an outer ring formed by connecting a plurality of arc-shaped outer ring members in a circumferential direction; and
a plurality of rollers arranged along an inner diameter surface of said outer ring, wherein
an oil groove extending in the circumferential direction is formed in an outer diameter surface of each said arc-shaped outer ring member, and
a circumferential gap formed at an abutment part of adjacent said arc-shaped outer ring members has a first dimension at a region containing said oil groove, and has a second dimension smaller than the first dimension at other regions.
2. The roller bearing according to claim 1, wherein each said outer ring member includes:
a flange part projecting from an axial end to a radial inner side; and
a bend part formed by bending the tip end of said flange part to an axial inner side, and
an inner diameter surface of said bend part functions as a sealing surface for preventing lubricant oil from flowing out of the inside of the bearing.
3. The roller bearing according to claim 2, wherein a gap δ between the inner diameter surface of the bend part and a phantom circle being internally in contact with said plurality of rollers satisfies that
5 μm≦δ≦50 μm.
4. The roller bearing according to claim 2, further comprising:
an annular member for preventing the lubricant oil from flowing out of the inside of the bearing, at a position to be in contact with the inner diameter surface of the bend part.
5. The roller bearing according to claim 2, wherein each said roller has a projection part projecting from an end face,
the outer diameter surface of said bend part functions as a guide part for guiding said projection part, and
said roller bearing is a full complement roller bearing in which adjacent rollers are arranged so as to be in contact with each other.

6. The roller bearing according to claim 1, wherein
said outer ring member has a flange part projecting from said outer ring member's axial end to a radial inner side, and
a rigidity lowered part is provided at least at the circumferential end of said flange part.

7. The roller bearing according to claim 6, wherein
the projection height of the flange part at said rigidity lowered part is lower than that of said flange part at the other regions.

8. The roller bearing according to claim 1, further comprising:
a retainer retaining an interval of adjacent said rollers, wherein
said retainer has an oil path penetrating in a radial direction.

9. The roller bearing according to claim 8, wherein
said retainer has a pair of ring parts, a plurality of column parts arranged between said pair of ring parts, and a pocket for holding said roller, between adjacent said column parts, and
said oil path is provided in said column part.

10. The roller bearing according to claim 9, wherein
said column part further has an oil groove passing through adjacent pockets in the circumferential direction.

11. The roller bearing according to claim 8, wherein
said retainer has a plurality of independent pocket parts for holding said rollers, and a connection part connecting said plurality of pocket parts in the circumferential direction, and
said oil path is provided between the adjacent pocket parts.

12. The roller bearing according to claim 8, wherein
said retainer has two rows of the plurality of pockets for holding said rollers in the axial direction, and
said oil path is provided between said two pocket rows.

13. A camshaft support structure comprising:
a camshaft;
a housing containing said camshaft; and
the roller bearing according to claim 1 supporting said camshaft rotatably with respect to said housing, wherein
an opening of an oil path in which lubricant oil flows is provided in a region of said housing containing said camshaft, and
said oil groove includes a position opposed to the opening of said oil path and extends in a circumferential direction.

14. The camshaft support structure according to claim 13, wherein
said oil groove is formed by a coining process.

15. The camshaft support structure according to claim 13, wherein
each said outer ring member is divided into a center region in which a track surface contacting said roller is formed on said outer ring member's inner diameter surface, and an end region adjacent to said center region, and
said oil groove is arranged in said end region.

16. The camshaft support structure according to claim 13, wherein
each said outer ring member has an oil hole penetrating from an outer diameter side to an inner diameter side, at a position opposed to the opening of said oil path, and a flange part projecting from an axial end to the radial inner side, and
said camshaft has a load region in which a large load is applied in said camshaft's circumferential direction when the bearing is used, and a non-load region in which a load smaller than the large load is applied when the bearing is used, and an opening part penetrating in an axial direction is provided in said flange part positioned in the load region when said outer ring member is incorporated in said camshaft.

17. The camshaft support structure according to claim 16, wherein
said opening part is arranged at a position apart from a phantom line extending in the direction of a maximum load applied from said camshaft to said roller bearing.

18. An internal combustion engine comprising:
a housing;
a cylinder provided in said housing;
a valve opening/closing an inlet path and an exhaust path continued to said cylinder;
a camshaft controlling the timing of the opening/closing of the valve; and
the roller bearing according to claim 1 supporting said camshaft rotatably with respect to said housing, wherein
an opening of an oil path in which lubricant oil flows is provided in a region of said housing containing said camshaft, and
said oil groove extends in the circumferential direction so as to contain the position opposed to the opening of said oil path.

19. A roller bearing comprising:
an outer ring formed by connecting a plurality of arc-shaped outer ring members in a circumferential direction; and
a plurality of rollers arranged along an inner diameter surface of said outer ring, wherein
said outer ring member includes:
a flange part projecting from an axial end to a radial inner side; and
a bend part formed by bending a tip end of said flange part to an axial inner side, and
the inner diameter surface of said bend part functions as a sealing surface for preventing lubricant oil from flowing out of the inside of the bearing.

20. A roller bearing comprising:
an outer ring formed by connecting a plurality of arc-shaped outer ring members in a circumferential direction; and
a plurality of rollers arranged along an inner diameter surface of said outer ring, wherein
said outer ring member includes:
a flange part projecting from said outer ring member's axial end to a radial inner side; and
a rigidity lowered part is provided at least at the circumferential end of said flange part.

21. A roller bearing comprising:
an outer ring formed by connecting a plurality of arc-shaped outer ring members in a circumferential direction;
a plurality of rollers arranged along an inner diameter surface of said outer ring, and
a retainer retaining an interval of adjacent rollers, wherein
said retainer has an oil path penetrating in a diameter direction.

22. A camshaft support structure comprising:
a camshaft;
a housing containing said camshaft; and
a roller bearing supporting said camshaft rotatably with respect to said housing, wherein
an opening of an oil path in which lubricant oil flows is provided in a region of said housing containing said camshaft, said roller bearing comprises an outer ring formed by circumferentially connecting a plurality of arc-shaped outer ring members having an oil hole penetrating from an outer diameter side to an inner diameter side, at a position opposed to the opening of said oil path, and a flange part projecting from an axial end to a radial inner side, and a plurality of rollers arranged along an inner diameter surface of said outer ring, and said camshaft has a load region in which a large load is applied in said camshaft's circumferential direction when the bearing is used, and a non-load region in which a load smaller than the large load is applied when the bearing is used, and an opening penetrating in the axial direction is provided in said flange part positioned in the load region when the outer ring member is incorporated in said camshaft.

* * * * *